(12) United States Patent
Ichihashi

(10) Patent No.: US 7,796,305 B2
(45) Date of Patent: Sep. 14, 2010

(54) IMAGE PROCESSING APPARATUS, IMAGE PROCESSING METHOD, AND PROGRAM

(75) Inventor: Yukichika Ichihashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1188 days.

(21) Appl. No.: 11/404,665

(22) Filed: Apr. 14, 2006

(65) Prior Publication Data

US 2006/0232683 A1 Oct. 19, 2006

(30) Foreign Application Priority Data

Apr. 19, 2005 (JP) .............................. 2005-121030

(51) Int. Cl.
*H04N 1/40* (2006.01)

(52) U.S. Cl. ...................... 358/461; 358/474; 358/452; 358/453

(58) Field of Classification Search ........................ None
See application file for complete search history.

(56) References Cited

U.S. PATENT DOCUMENTS

| | | | | |
|---|---|---|---|---|
| 5,016,096 A * | 5/1991 | Matsunawa et al. | ......... | 358/538 |
| 5,048,109 A * | 9/1991 | Bloomberg et al. | ......... | 382/164 |
| 5,136,401 A * | 8/1992 | Yamamoto et al. | ......... | 358/474 |
| 5,216,498 A * | 6/1993 | Matsunawa et al. | ......... | 358/500 |
| 5,974,171 A * | 10/1999 | Hayashi et al. | ............. | 382/162 |
| 6,084,983 A * | 7/2000 | Yamamoto | .................. | 382/167 |
| 6,175,660 B1 * | 1/2001 | Nabeshima et al. | ......... | 382/274 |
| 6,181,444 B1 * | 1/2001 | Sato | ............................. | 358/519 |
| 6,373,602 B1 * | 4/2002 | Kohler et al. | ................ | 358/538 |
| 6,535,706 B1 * | 3/2003 | Konno | .......................... | 399/182 |
| 6,671,684 B1 * | 12/2003 | Hull et al. | ....................... | 707/6 |
| 6,967,605 B2 * | 11/2005 | Fujihara et al. | .............. | 341/139 |
| 7,245,740 B2 * | 7/2007 | Suzaki | ......................... | 382/100 |
| 7,324,243 B2 * | 1/2008 | Cheng | ......................... | 358/461 |
| 7,352,496 B2 * | 4/2008 | Han | ............................ | 358/474 |
| 7,386,185 B2 * | 6/2008 | Watanabe et al. | ........... | 382/274 |
| 7,590,289 B2 * | 9/2009 | Ishii et al. | .................... | 382/209 |
| 2002/0097903 A1 * | 7/2002 | Prakash | ...................... | 382/137 |
| 2004/0090646 A1 * | 5/2004 | Saitoh et al. | ................ | 358/1.14 |
| 2006/0077419 A1 * | 4/2006 | Sugiura et al. | ............. | 358/1.14 |
| 2006/0209356 A1 * | 9/2006 | Sekizawa et al. | ........... | 358/448 |
| 2006/0209363 A1 * | 9/2006 | Suenaga et al. | ............. | 358/474 |

FOREIGN PATENT DOCUMENTS

| | | |
|---|---|---|
| JP | 05-344314 A | 12/1993 |
| JP | 2001-236463 A | 8/2001 |
| JP | 2002-118735 A | 4/2002 |

* cited by examiner

*Primary Examiner*—Mark K Zimmerman
*Assistant Examiner*—Dung D Tran
(74) *Attorney, Agent, or Firm*—Canon U.S.A., Inc. I.P. Division

(57) ABSTRACT

An image processing apparatus includes a first shading correction unit configured to perform shading correction for first image data by using a correction coefficient that is set for yielding an area corresponding to the luminance of a corrected trace, and a corrected trace detecting unit configured to perform first image processing for second image data resulting from correction of the first image data by the first shading correction unit to detect the corrected trace.

9 Claims, 19 Drawing Sheets

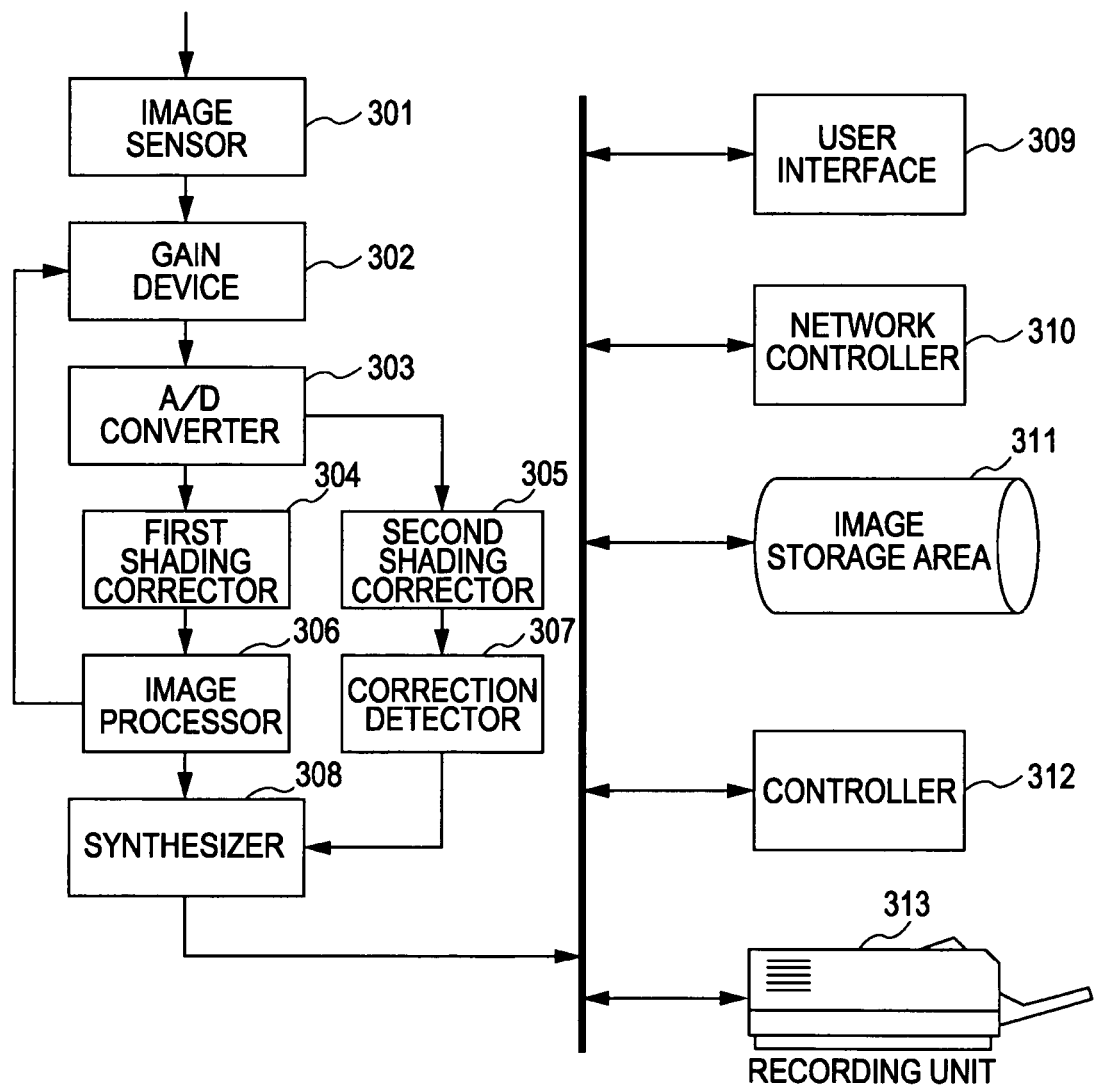

CORRECTION FLUID TRACE

↓ SHADING CORRECTION

FIG. 8A
OUTPUT IMAGE FROM 305
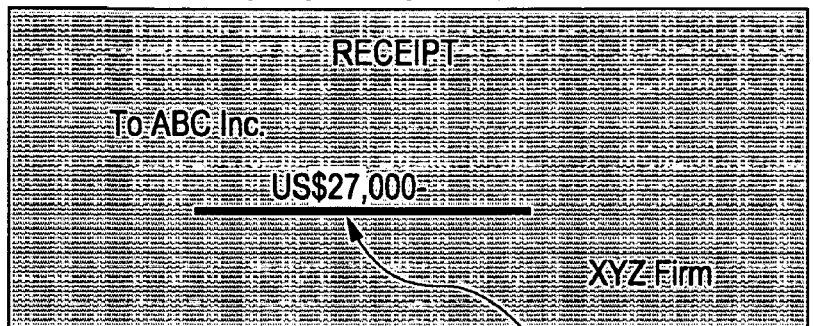
CORRECTION FLUID TRACE: LUMINANCE 255
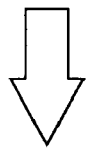
FIG. 8B
IMAGE AFTER BINARIZATION
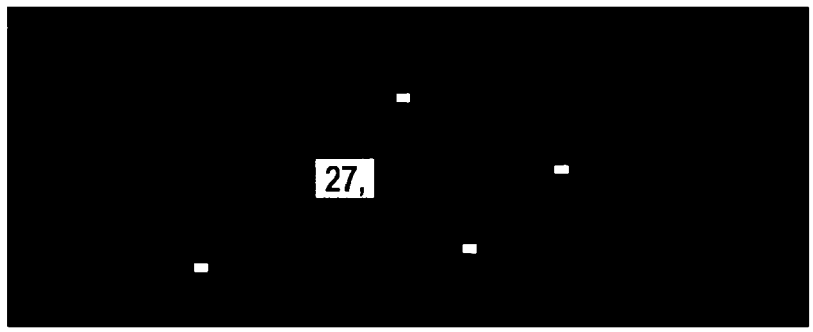
FIG. 9
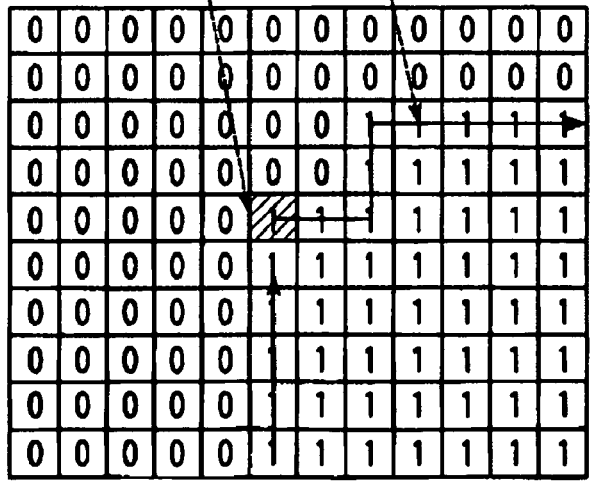

CORRECTION-FLUID TRACE AREA

ISOLATED AREA IS INCLUDED IN NON-CORRECTION-FLUID-TRACE AREA

IMAGE PROCESSING APPARATUS, IMAGE PROCESSING METHOD, AND PROGRAM

BACKGROUND OF THE INVENTION

1. Field of the Invention

The present invention relates to image scanning apparatuses, image scanning methods, and computer programs. More particularly, the present invention relates to an image scanning apparatus that converts an image of a document part of which is corrected with correction fluid or the like into electronic form; to an image forming apparatus, which is a copy machine having a copy function of recording and printing the image converted into the electronic form by an image scanning apparatus; to an image forming apparatus, which is a multifunction peripheral having the copy function, to an image scanning method; and to a program which implements the aforementioned functionality.

2. Description of the Related Art

FIG. 1 is a block diagram showing an example of the configuration of an image forming apparatus, which has any of functions including copying, image scanning, image transmission, image reception, printing, box storage, and so on and which is a multifunction peripheral in a related art. The image forming apparatus in FIG. 1 includes an image scanning unit including an image sensor 101, a gain device 102, an analog-to-digital (A/D) converter 103, a shading corrector 104, and an image processor 106. The image forming apparatus typically also includes a user interface 109, a network controller 110, an image storage area 111, a controller 112, and a recording unit 113. The image forming apparatus in the related art reads an image to convert the read image into electronic form and to record the converted image. The operation of, particularly, the image scanning unit in the related art will be described with reference to FIG. 1.

In the image forming apparatus in FIG. 1, the image sensor 101 converts an image of a document into a voltage that is converted into an analog electrical signal. The analog signal obtains a predetermined amount of gain in the gain device 102. Generally, the voltage of the analog signal is set such that a desired white-paper or white reference value does not exceed a maximum value of the input voltage of the A/D converter 103 or such that the desired white-paper or white reference value is smaller than the maximum value of the input voltage of the A/D converter 103 by 10 to 20 percent. This is because, if the white-paper or white reference value is exceeded before the analog signal reaches the A/D converter 103, the information concerning the white-paper or white reference value is completely lost and, therefore, the information concerning high-luminance image data disappears. Decreasing the gain setting by more than 20 percent allows higher-luminance areas of a document to be digitized. However, in this case, the range of discrete information in the A/D converter 103 is expanded to degrade the precision of lower or intermediate luminances. As a result, it is not possible to yield a fine image.

For the above reason, an appropriate value is generally set in the gain device 102 such that the white-paper or white reference value is not exceeded and the tone in the lower or intermediate luminances is kept. The image information given an appropriate voltage in the gain device 102 is converted into a digital image in the A/D converter 103. The digital image is subjected to shading correction for every pixel in the shading corrector 104 according to Formula 1.

$$V'n = C * Vn/Wn \qquad \text{[Formula 1]}$$

where

V'n denotes the luminance of a digital image signal of the n-th pixel in a main scanning direction after the shading correction;

C denotes a shading correction coefficient;

Vn denotes the luminance of a digital image signal of the n-th pixel in the main scanning direction before the shading correction; and Wn denotes the luminance of a digital luminance signal of the n-th pixel in the main scanning direction on a white reference plate (shading correction data (n denotes a position in the main scanning direction)).

According to the above equation, the luminances of the pixels in the main scanning direction are corrected, and all the pixels are normalized so as to output a predetermined digital value and have the same output luminance for the reference white. At this time, the shading correction coefficient C, which is a coefficient of the luminance, is used to set a maximum output value, that is, an output level "255" in the case of 8-bit grayscale. Normally, the luminance level having the output level "255" is made slightly lower than a white-paper level and the white-paper level of the background is set so as to reach the value "255". This is because reducing the luminance level of the background causes the background to become dark. The dark background has adverse effects including a decrease in compression ratio in compression of the information, a reduction in image quality in recording of the information, and a visual problem in display of the information.

FIGS. 2A to 2C illustrate adjustment of the luminance level from the gain adjustment to the shading correction in the image forming apparatus in the related art. FIGS. 2A to 2C show states of a typical output luminance when the image sensor 101 is included in a reduction optical system. As shown in FIG. 2A, the output luminance is curved upward at the center due to the difference in distance of light rays toward the device or a problem of the efficiency of the light emitting device. Next, as shown in FIG. 2B, the peak luminance at the center is given a gain to be set to a desired luminance by the gain adjustment and is digitized. Finally, as shown in FIG. 2C, all the pixels are normalized in the main scanning direction in the shading correction so as to provide a desired digital output.

Referring back to FIG. 1, the digital image normalized in the shading correction is subjected appropriate image processing in the image processor 106 in order to be transferred to a computer by copying, via facsimile communication, or over a network and to be displayed. In the image processor 106, the digital image is subjected to, for example, edge enhancement for finely displaying characters, change of the resolution, and compression. If the gain adjustment etc., described above, are automatically performed, the image processor 106 may control the gain device 102.

The digital image information is supplied to the image storage area 111, the recording unit 113, the network controller 110, and so on through a bus in the image forming apparatus and is subjected to desired processing.

The image scanning method on the basis of the white-paper or white reference value, described above, has a problem in that corrected trace with correction fluid etc. becomes completely invisible. In other words, since the correction fluid trace has a luminance value higher than that of the white paper in the image after the shading correction, the correction fluid trace has the same value (output level "255"), which is the maximum value, as the white paper.

FIGS. 5A and 5B show a correction fluid trace in images before and after the shading correction in the related art. As shown in FIG. 5B, the correction fluid trace is assimilated to the background and, therefore, persons other than a person who has read the document cannot detect whether the document has any correction fluid trace. In this case, although it is possible to yield a visually fine image, it is also possible to file a copy or an electric form of a receipt, financial statement, or public record that has been modified with the correction fluid and, thus, the reliability of the document is significantly decreased.

In addition, adjusting the shading correction coefficient so that the correction fluid trace can be detected in the document image that has been converted into electronic form causes the background not to have the output level "255" to substantially degrade the output image.

Under the situations described above, Japanese Patent Laid-Open No. 2001-236463 discloses a method of using two image scanners, that is, a reflective image scanner and a transparent image scanner, to yield a difference in luminance between the two image scanners in order to detect any correction fluid trace. In addition, Japanese Patent Laid-Open No. 2002-118735 discloses a method of comparing images before and after correction to detect and demonstrate any corrected portion.

However, in the method disclosed in Japanese Patent Laid-Open No. 2001-236463, it is inevitable to increases the apparatus in size and cost because of the use of the two types (reflective type and transparent type) of image scanners. In the method disclosed in the Japanese Patent Laid-Open No. 2002-118735, since it is necessary to read the image before correction in advance, it is difficult to ensure the reliability of the document that is tampered with the correction fluid.

Accordingly, there is a demand for an image scanning apparatus capable of detecting any correction fluid trace in a structure that is compact and reduced in cost while providing fine images similar to those in image scanning apparatuses in the related arts. There is also a demand for an image scanning apparatus capable of detecting whether a document converted into electronic form has any correction fluid trace. The image scanning apparatuses in the related arts have room for improvement in terms of these points.

SUMMARY OF THE INVENTION

The present invention provides an image scanning apparatus and an image scanning method, which are capable of determining whether any correction fluid trace is included in an original document from a print or an electronic image of the document to which the correction fluid is applied to ensure the reliability of the document while suppressing increase in size and cost.

According to a first embodiment of the present invention, an image scanning apparatus is provided which includes a gain unit configured to convert image information into a voltage and apply a desired gain to the voltage during a scanning operation; an analog-to-digital conversion unit configured to digitize the image information to generate a digital image; a first shading correction unit configured to perform shading correction to the digital image by using a first coefficient correlated to a white reference value to yield a first corrected image; a second shading correction unit configured to perform shading correction to the digital image by using a second coefficient correlated to a corrected trace to yield a second corrected image having a luminance higher than the white reference value; an image processing unit configured to perform image processing to the first corrected image to generate first digital image information; a correction detecting unit configured to detect the corrected trace to generate second digital image information which is detection information concerning the corrected trace; and a synthesizing unit configured to synthesize the first and second digital image information together to generate third digital image information in which the detection information concerning the corrected trace is embedded in the first digital image information.

According to an aspect of the aforementioned embodiment, the correction detecting unit is configured to detect the corrected trace on a basis of a difference between the first and second corrected images.

According to another embodiment of the present invention, an image scanning apparatus is provided which includes a gain unit configured to convert image information into a voltage and apply a desired gain to the voltage during a first scanning operation; an analog-to-digital conversion unit configured to digitize the image information to generate a digital image; a shading correction unit configured to perform shading correction to the digital image by using a first coefficient correlated to a white reference value to yield a first corrected image, and to perform shading correction to the digital image by using a second coefficient correlated to a corrected trace to yield a second corrected image having a luminance higher than the white reference value; an image processing unit configured to perform image processing to the first corrected image to generate first digital image information; a correction detecting unit configured to detect the corrected trace to generate second digital image information which is detection information concerning the corrected trace; and a synthesizing unit configured to synthesize the first and second digital image information together to generate third digital image information in which the detection information concerning the corrected trace is embedded in the first digital image information.

According to an aspect of the aforementioned embodiment, in the first scanning operation, the gain unit and the analog-to-digital conversion unit are operated, the shading correction unit outputs the first corrected image, and the image processing unit generates the first digital image information; and in a second scanning operation, the gain unit and the analog-to-digital conversion unit are operated, the shading correction unit outputs the second corrected image, and the correction detecting unit generates the second digital image information.

According to another embodiment of the present invention, an image forming apparatus is provided in combination with an image scanning apparatus, the scanning apparatus including a gain unit configured to convert image information into a voltage and apply a desired gain to the voltage during a scanning operation; an analog-to-digital conversion unit configured to digitize the image information to generate a digital image; a first shading correction unit configured to perform shading correction to the digital image by using a first coefficient correlated to a white reference value to yield a first corrected image; a second shading correction unit configured to perform shading correction to the digital image by using a second coefficient correlated to a corrected trace to yield a second corrected image having a luminance higher than the white reference value; an image processing unit configured to perform image processing to the first corrected image to generate first digital image information; a correction detecting unit configured to detect the corrected trace from the second corrected image to generate second digital image information which is detection information concerning the corrected trace; and a synthesizing unit configured to synthesize the first and second digital image information together to generate third digital image information in which the detection information concerning the corrected trace is embedded in the first digital image information.

According to still yet another embodiment of the present invention, an image scanning method is provided which includes converting image information into a voltage and applying a desired gain to the voltage during a scanning operation; digitizing the image information to generate a digital image; performing shading correction to the digital image by using a first coefficient correlated to a white reference value to yield a first corrected image that is finer than the digital image; performing shading correction to the digital image by using a second coefficient correlated to a corrected trace to yield a second corrected image having a luminance higher than the white reference value; performing image processing to the first corrected image to generate first digital image information; detecting the corrected trace to generate second digital image information which is detection information concerning the corrected trace; and synthesizing the first and second digital image information together to generate third digital image information in which the detection information concerning the corrected trace is embedded in the first digital image information.

And, according to an aspect of the aforementioned embodiment, the corrected trace is detected on the basis of a difference between the first and second corrected images.

Still further, according to another embodiment of the present invention, an image scanning method is provided which includes converting image information into a voltage and applying a desired gain to the voltage in a first scanning operation; digitizing the image information to generate a digital image; performing shading correction to the digital image by using a first coefficient correlated to a white reference value to yield a first corrected image; performing image processing to the first corrected image to generate first digital image information; converting image information into a second voltage and applying a desired second gain to the second voltage in a second scanning operation; digitizing the image information to which the second gain is applied to generate a second digital image; performing shading correction to the second digital image by using a second coefficient correlated to a corrected trace to yield a second corrected image having a luminance higher than the white reference value; detecting the corrected trace to generate second digital image information which is detection information concerning the corrected trace; and synthesizing the first and second digital image information together to generate third digital image information in which the detection information concerning the corrected trace is embedded in the first digital image information.

Furthermore, according to another embodiment of the present invention, a computer readable medium is provided containing computer-executable instructions for causing a computer to execute an image scanning process, the medium including instructions for converting image information into a voltage and applying a desired gain to the voltage in a scanning operation; instructions for digitizing the image information to which the gain is applied to generate a digital image; instructions for performing shading correction to the digital image by using a first coefficient correlated to a white reference value to yield a first corrected image; instructions for performing shading correction to the digital image by using a second coefficient correlated to a corrected trace to yield a second corrected image having a luminance higher than the white reference value; instructions for performing image processing to the first corrected image to generate first digital image information; instructions for detecting the corrected trace from the second corrected image to generate second digital image information which is detection information concerning the corrected trace; and instructions for synthesizing the first and second digital image information together to generate third digital image information in which the detection information concerning the corrected trace is embedded in the first digital image information.

Moreover, according to another embodiment of the present invention, an image processing apparatus is provided which includes a first shading correction unit configured to perform shading correction to first image data by using a first coefficient selected for yielding an area corresponding to a luminance of a corrected trace; and a corrected trace detecting unit configured to perform image processing to second image data resulting from correction of the first image data to detect the corrected trace.

Additionally, another aspect of the aforementioned embodiment may include the image processing including at least one of binarization, removal of an isolated point, detection of a closed curve, and determination of a size of the area surrounded by the closed curve. Furthermore, the image processing apparatus may include further a second shading correction unit configured to use a second correction coefficient selected for yielding a white area to perform shading correction to the first image data; and an image processing unit configured to perform image processing to third image data resulting from correction of the first image data by the second shading correction unit to generate digital image information. Further, the image processing apparatus may also include a synthesizing unit configured to embed information concerning the corrected trace in the digital image information as a digital watermark.

And, in another embodiment of the present invention, an image processing apparatus is provided which has a corrected trace correction mode for detecting a corrected trace in image data, the apparatus including a receiving unit configured to receive the image data; and a corrected trace detecting unit configured to perform shading correction to the image data when the corrected trace correction mode is specified to detect the corrected trace.

Furthermore, in another embodiment of the present invention, an image processing apparatus is provided which includes an arithmetic unit configured to perform arithmetic processing to an image signal; and a separating unit configured to separate the image signal into a white paper level and a corrected trace level.

Additionally, according to yet another embodiment of the present invention, an image processing method is provided which includes performing shading correction to first image data by using a correction coefficient set for yielding an area corresponding to luminance of a corrected trace; and performing image processing to second image data resulting from the shading correction to detect the corrected trace.

And, in yet another embodiment of the present invention, a computer readable medium containing computer-executable instructions for causing a computer to execute an image scanning process is provided, the medium including instructions for performing shading correction to the first image data by using a correction coefficient set for yielding an area corresponding to a luminance of a corrected trace; and instructions for performing image processing to second image data resulting from the shading correction to detect the corrected trace.

Still further, in another embodiment of the present invention, an image processing method is provided for an image processing apparatus having a corrected trace detecting mode for detecting a corrected trace in image data, the method including receiving the image data; and performing shading correction to the image data when the corrected trace detecting mode is specified to detect the corrected trace.

Furthermore, according to another embodiment of the present invention, a computer readable medium is provided containing computer-executable instructions for causing a computer to execute an image scanning process, the medium including instructions for receiving the image data; and instructions for performing shading correction to the image data when a corrected trace detecting mode is specified to detect a corrected trace in the image data.

Moreover, according to another embodiment of the present invention, an image processing method is provided including performing arithmetic processing to an image signal; and separating the image signal into a white paper level and a corrected trace level.

And finally, in still yet another embodiment of the present invention, a computer readable medium containing computer-executable instructions is provided for causing a computer to execute an image scanning process, the medium including instructions for performing arithmetic processing to an image signal; and instructions for separating the image signal into a white paper level and a corrected trace level.

Accordingly, it is possible to detect any correction fluid trace in a hardware structure having reduced size and cost, compared with image scanning apparatuses in related arts. In addition, it is possible for a person other than the person who has produced a copy or an electronic image of an original document to which correction fluid is applied to determine whether any correction fluid trace is included in the original document from the copy or the electronic image of the document to ensure the reliability of the document.

Further embodiments, features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a block diagram showing an example of the configuration of an image forming apparatus according to a first exemplary embodiment of the present invention.

FIGS. 8A and 8B illustrate exemplary binarization in the detection of the correction fluid trace, to which the present invention is applicable.

FIG. 9 illustrates an example of how to detect a closed curve in the detection of the correction fluid trace, to which the present invention is applicable.

FIGS. 11A and 11B illustrate an exemplary manner of how to detect a predetermined size area in the detection of the correction fluid trace, to which the present invention is applicable.

DESCRIPTION OF THE EMBODIMENTS

Figure 1:
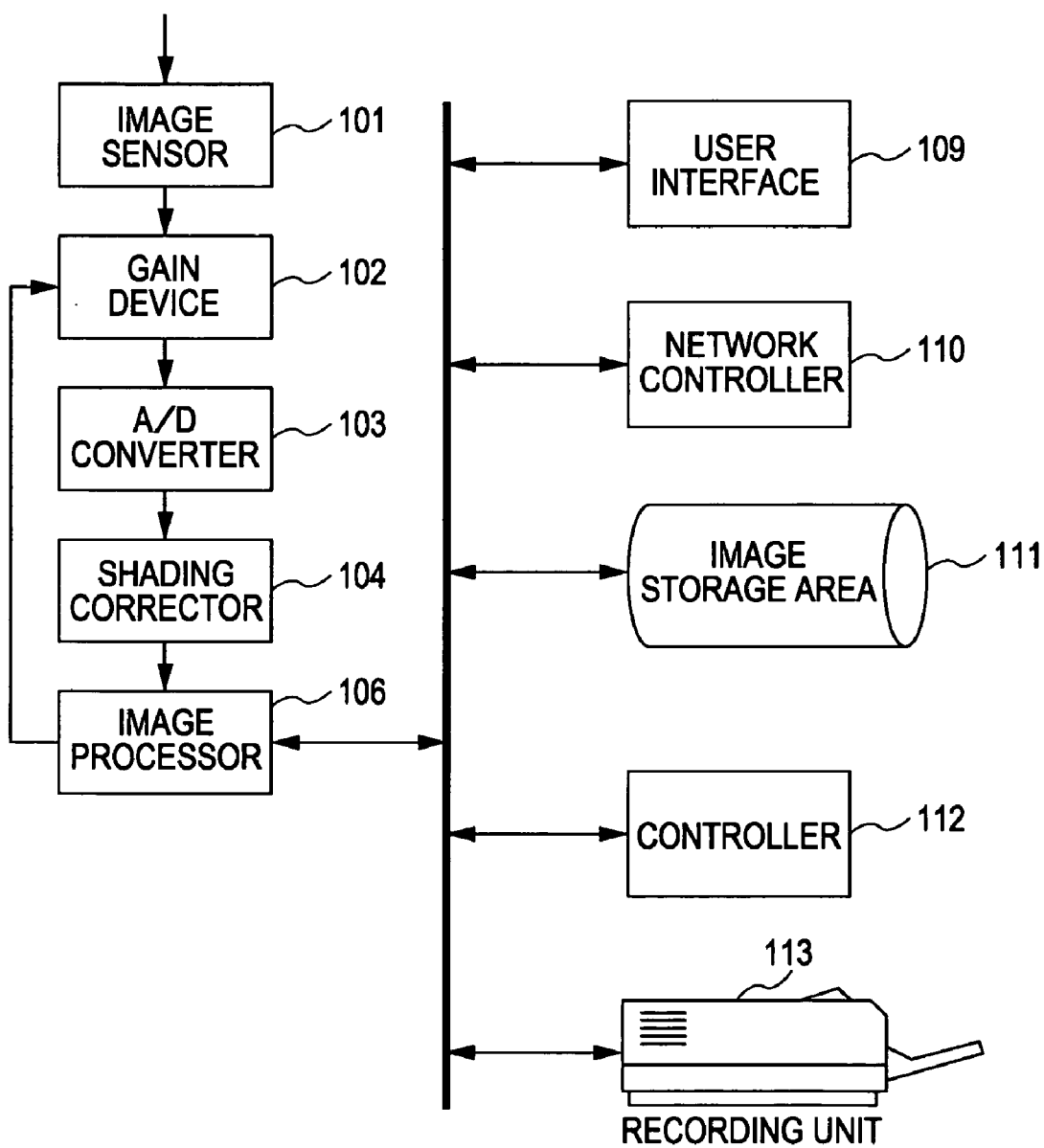
FIG. 1 is a block diagram showing an example of the configuration of an image forming apparatus in a related art.

Various embodiments, features and aspects of the present invention will be described in detail with reference to the attached drawings. It is noted that the same reference numerals are used in the drawings to identify similar components having similar functions.

First Exemplary Embodiment

FIG. 3 is a block diagram showing an example of the configuration of an image forming apparatus according to a first exemplary embodiment of the present invention. An image sensor 301 converts an image of a document into a voltage. A gain device 302 applies a gain to the voltage of the image sensor 301, which voltage is increased to a desired voltage. An A/D converter 303 converts the voltage into digital information. A first shading corrector 304 is used for yielding a correct image luminance by a common method. A second shading corrector 305 performs the shading correction in consideration of the luminance of correction fluid.

An image processor 306 performs image processing for the information supplied from the first shading corrector 304 by a common method to yield a fine image. The image processor 306 performs, for example, edge enhancement and unsharp mask for finely displaying characters, Moire correction for reducing Moire patterns, and/or change of resolution and gamma correction according to a user's preference. However, since these processes are well-known, a detailed description is omitted herein. If the gain adjustment etc. are automatically performed, the image processor 306 may control the gain device 302.

A correction detector 307 uses the output from the second shading corrector 305 to detect any correction fluid trace and outputs positional information of the corrected portion or the corrected image. A synthesizer 308 synthesizes the information detected by the correction detector 307 with the image supplied from the image processor 306. The image forming apparatus in FIG. 3 includes an image scanning unit including the components from the image sensor 301 to the synthesizer 308.

A user interface 309 is a panel which is used by the user to operate the image forming apparatus according to the first exemplary embodiment and in which information is displayed. A network controller 310 is used when the image forming apparatus according to the first exemplary embodiment processes the image information and/or tasks including printing in cooperation with an external device, such as a personal computer (PC), over a local area network (LAN) or via a universal serial bus (USB). An image storage area 311 has the image information temporarily stored therein. A controller 312 controls the entire image forming apparatus according to the first exemplary embodiment, and includes a central processing unit (CPU) that performs the image processing and programs used by the CPU to operate in accordance with a process shown in FIG. 18. A recording unit 313 is used for printing the image information when the user selects the copying or printing in the image forming apparatus according to the first exemplary embodiment.

Figure 4:
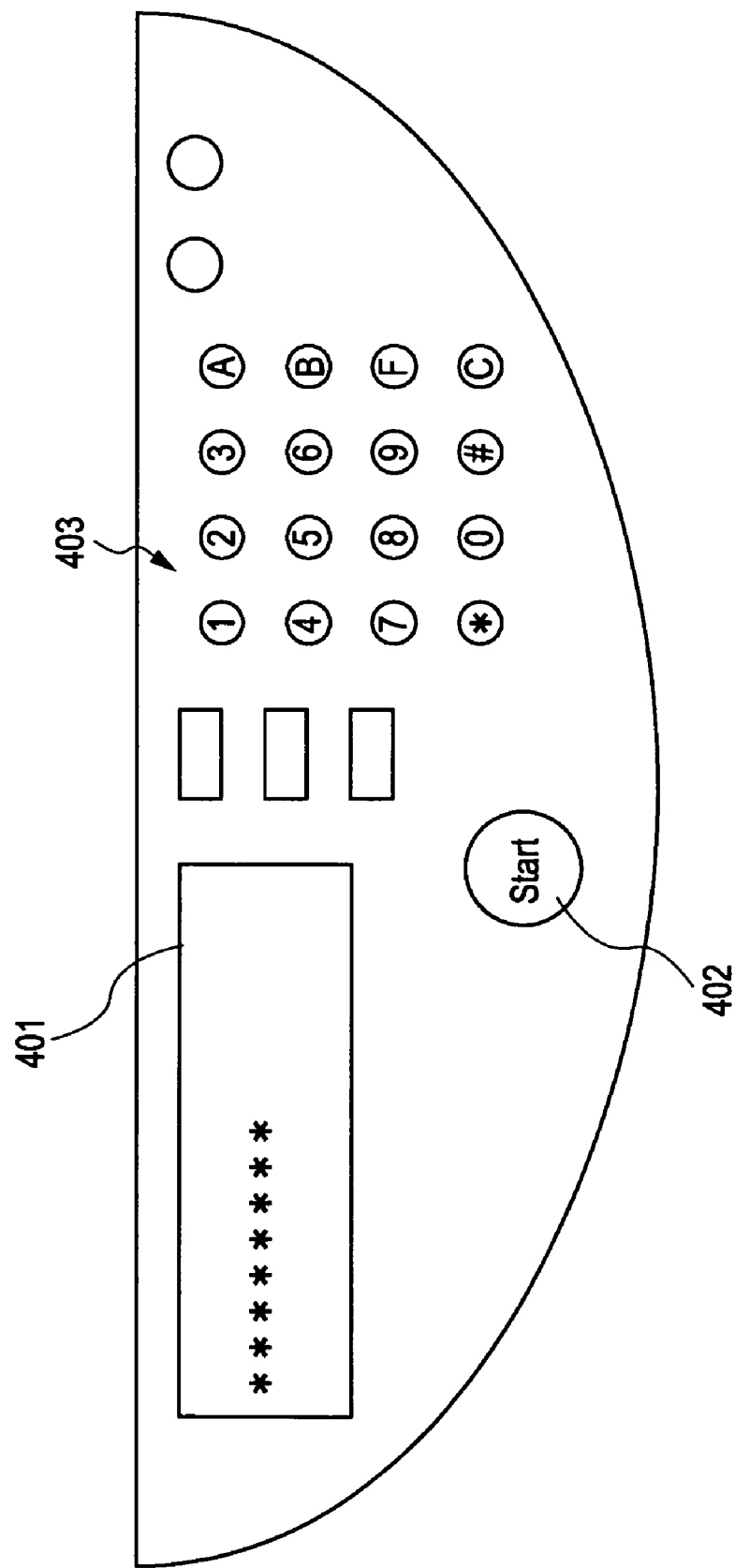
FIG. 4 illustrates an exemplary operation panel to which the present invention is applicable.
Figure 5A:
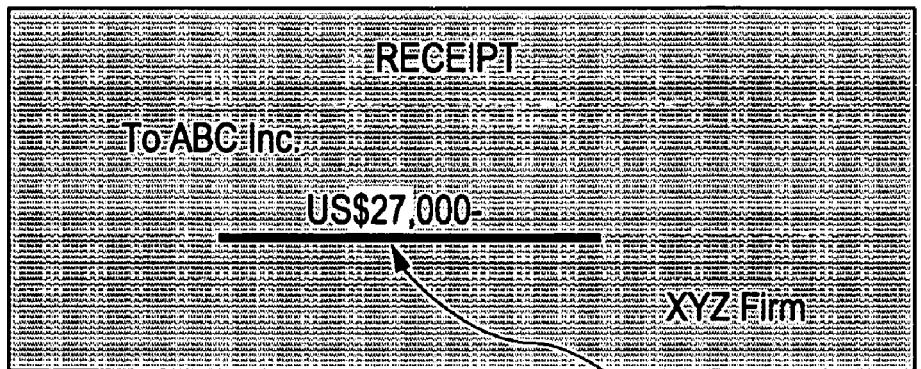
FIGS. 5A and 5B show a correction fluid trace in images before and after the shading correction in a related art.
Figure 5B:
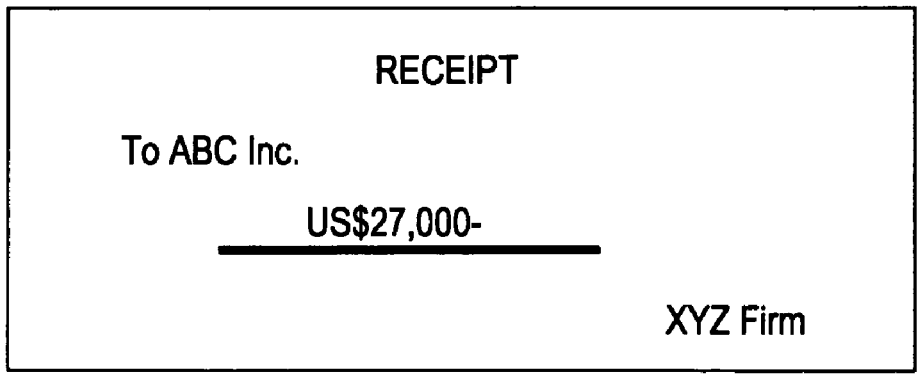

FIG. 4 illustrates a button operation unit on an operation panel connected to the user interface 309. Referring to FIG. 4, reference numeral 401 denotes a liquid crystal display, reference numeral 402 denotes a start button, and reference numeral 403 denotes a button section. The buttons in the button operation unit are used to determine a functional mode in the image forming apparatus according to the first exemplary embodiment.

[Exemplary Operation]

Figure 18:
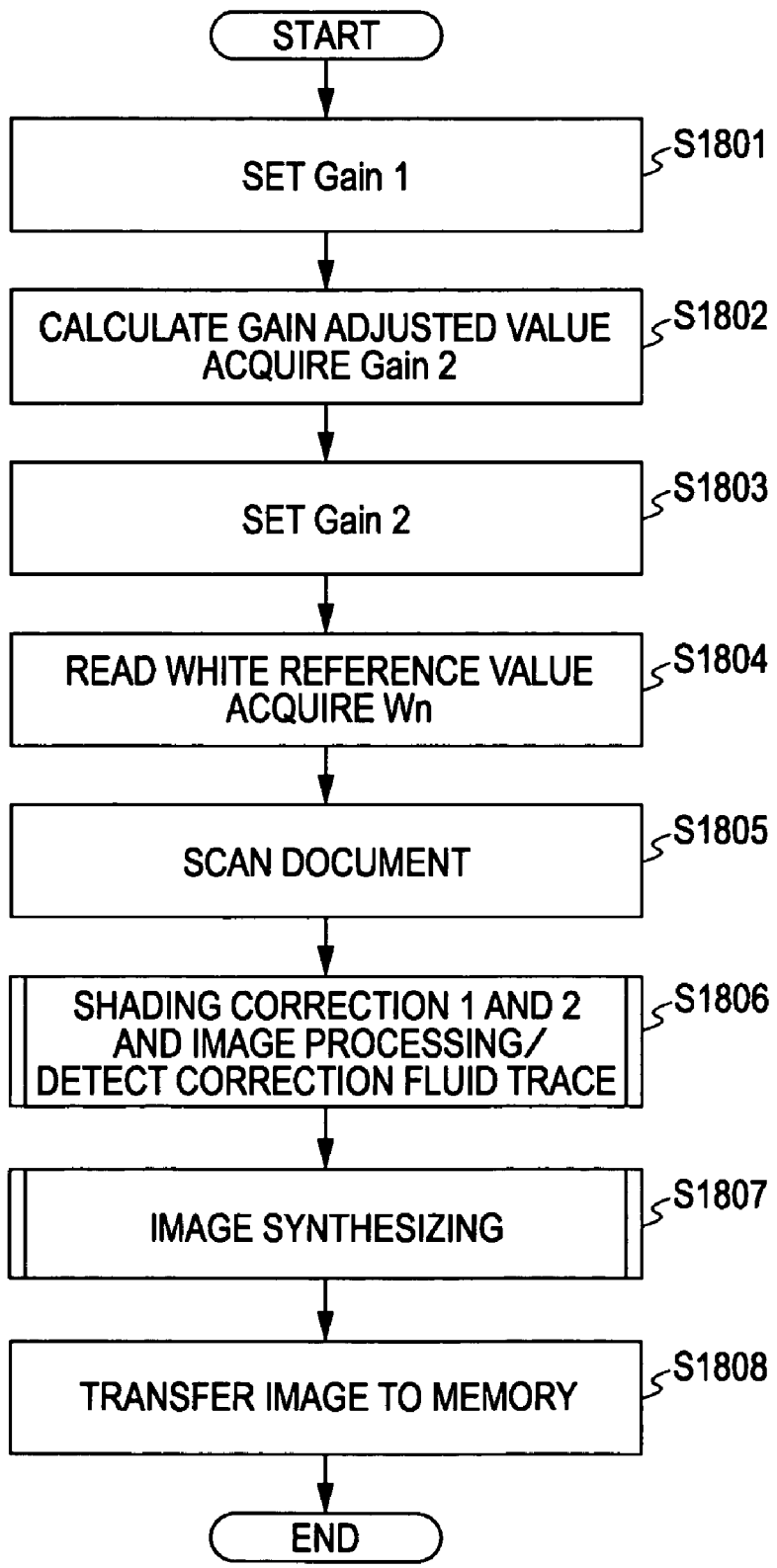
FIG. 18 is a flowchart showing a process in the image forming apparatus according to the first exemplary embodiment.

FIG. 18 is a flowchart showing a process in the image forming apparatus according to the first exemplary embodiment. The aforementioned process will be described in detail with reference to FIGS. 3 and 18. A case where the user selects electronic imaging in a public record mode or a case where the user selects a corrected trace detection mode, by operating the button section 403 in the button operation unit on the operation panel, in FIG. 4, connected to the user interface 309, will be described.

The controller 312 starts to read an image on the basis of the operational information supplied from the user interface 309. In Step S1801, the controller 312 causes the image sensor 301 to read a white reference value in a state in which an image having a higher luminance can be read, that is, in a state in which a small amount of gain (Gain 1) is set in the gain device 302, to obtain the voltage of the white reference value. The white reference value is generally a value of a white plate mounted to a reader. The image having the white reference value is given a small amount of gain in the gain device 302 and is digitized in the A/D converter 303 to generate a digital image before the gain adjustment.

The image processor 306 under the control of the controller 312 or the controller 312 detects luminance information E1 (reference numeral E hereinafter denotes a voltage) producing a maximum luminance, in the digital image before the gain adjustment, to calculate a gain used for actually reading an image of a document according to the following equation.

$$\text{Gain } 2 = E2 \times \text{Gain } 1/E1 \quad \text{[Formula 2]}$$

where, for example, "2.8" is substituted for E2 if the output level of the white reference value is set to 2.8 V.

In Step S1802, Gain 2 is adjusted such that the voltage E2 when the luminance of the correction fluid is read is within the range of the input voltage of the A/D converter 303. In Step S1803, Gain 2 that is adjusted is set in the gain device 302. In Step S1804, the image sensor 301 reads the white reference value again. Gain 2 is applied to the voltage of the read image in the gain device 302, and the image is converted into digital information for every pixel in the A/D converter 303. After the conversion into the digital information, shading correction data Wn (n denotes a position in the main scanning direction) is acquired in the first shading corrector 304 or the second shading corrector 305.

In Step S1805, the image sensor 301 scans a document set by the user. The gain device 302 applies Gain 2 to the analog image, which is scanned by the image sensor 301 and has a voltage converted for every pixel in the document, and the analog image has the voltage E2. The analog image having the voltage E2 is converted into a digital image V2 (V hereinafter denotes a luminance) in the A/D converter 303, and the digital image is supplied to the first shading corrector 304 and the second shading corrector 305.

First, the operation of the first shading corrector 304 in Step S1806 will be described. In order to read an image having a higher quality, the shading correction is performed in the first shading corrector 304 according to Formula 3.

$$V3n = C1 * V2n/Wn \quad \text{[Formula 3]}$$

where

C1 denotes a first shading correction coefficient,

V3n denotes the luminance of a digital image signal of the n-th pixel in the main scanning direction after the shading correction, V2n denotes the luminance of a digital image signal of the n-th pixel in the main scanning direction before the shading correction, and Wn denotes the shading correction data.

Figure 2A:
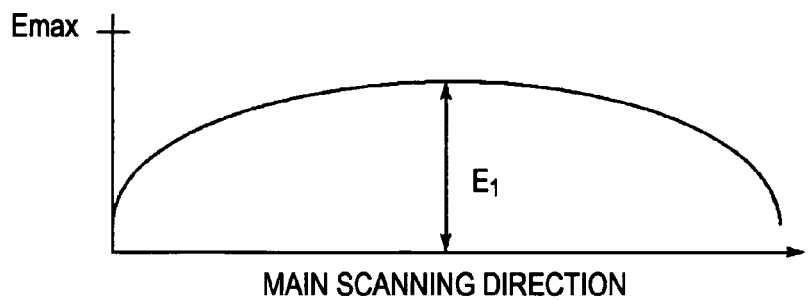
FIGS. 2A to 2C illustrate adjustment of a luminance level from gain adjustment to shading correction in the image forming apparatus in the related art.
Figure 2B:
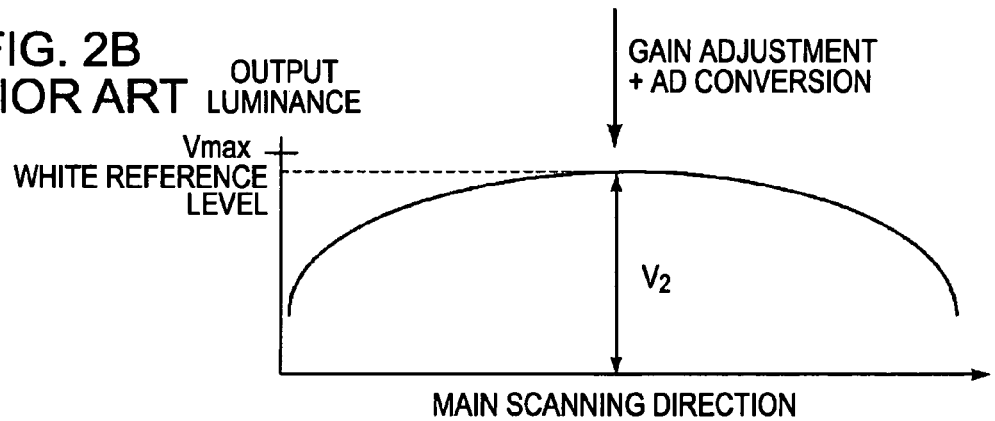
Figure 2C:
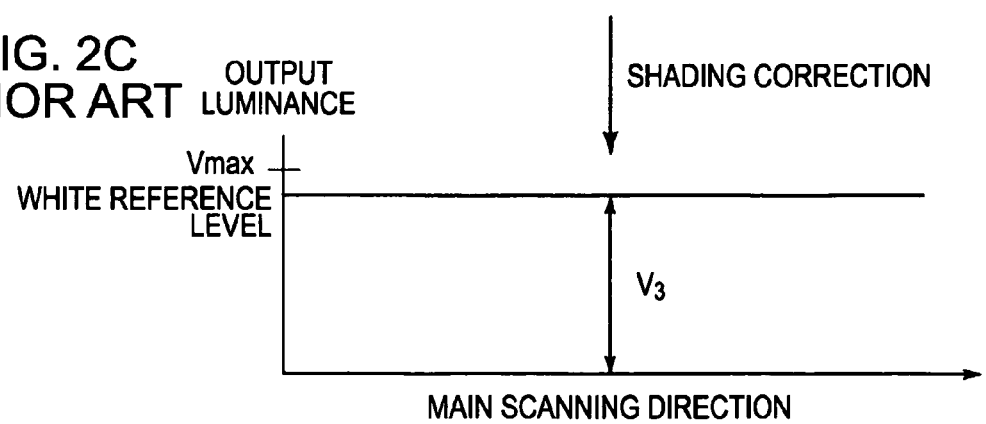

Generally, in the 8-bit grayscale, it is necessary to perform the shading correction such that the output level of the white paper, which is the background, becomes about "255". Accordingly, the first shading correction coefficient C1 is adjusted with respect to the white-paper reference value. The adjustment of the luminance level from the gain adjustment to the shading correction is performed in the same manner as in the related art, described above with reference to FIGS. 2A to 2C.

Next, the operation of the second shading corrector 305 in Step S1806 will be described. The shading correction in consideration of the correction fluid is performed in the second shading corrector 305 according to Formula 4.

$$V3n = C2 * V2n/Wn \quad \text{[Formula 4]}$$

where

C2 denotes a second shading correction coefficient,

V3n denotes the luminance of a digital image signal of the n-th pixel in the main scanning direction after the shading correction, V2n denotes the luminance of a digital image signal of the n-th pixel in the main scanning direction before the shading correction, and Wn denotes the shading correction data.

The target of the second shading correction coefficient C2 is the correction fluid trace having a luminance higher than that of the white paper. Here, the second shading correction coefficient C2 is adjusted such that the luminance of the correction fluid trace reaches "255", and that the white-paper reference value (background) is equal to a value that does not cause saturation. That is, only the correction fluid trace has the output level "255" and the other parts have the output levels not more than "254".

Figure 6:
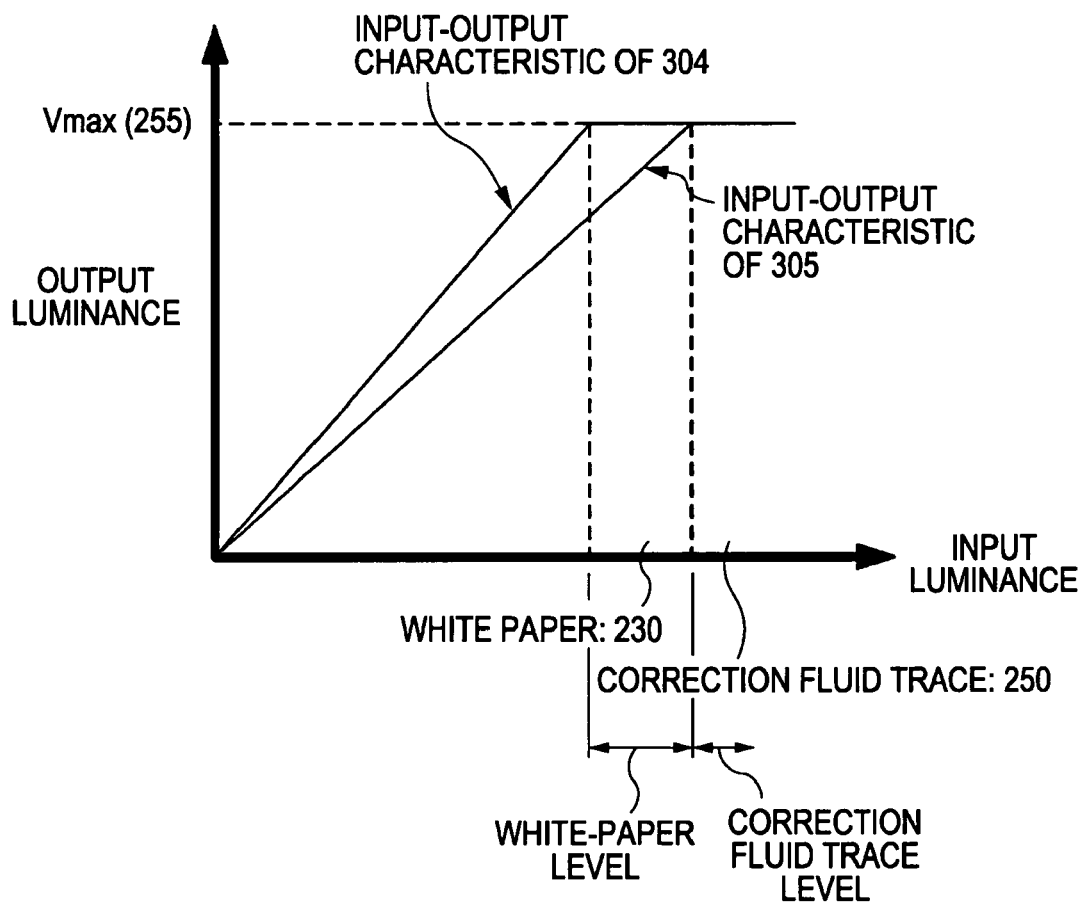
FIG. 6 illustrates the relationship between an input luminance and an output luminance, in a first shading corrector and a second shading corrector, according to the first embodiment of the present invention.

FIG. 6 illustrates the relationship between the input luminance and the output luminance, in the first shading corrector 304 using the first shading correction coefficient C1 and the second shading corrector 305 using the second shading correction coefficient C2. Referring to FIG. 6, if the input luminance on the horizontal axis is equal to a white-paper level "230", the output from the first shading corrector 304 is normalized so as to reach a luminance level "Vmax (255)" whereas the output from the second shading corrector 305 is normalized to a luminance level "235". In contrast, the white correction fluid trace having the input luminance "250" is normalized so as to reach the luminance level "255" both in the output from the first shading corrector 304 and in the output from the second shading corrector 305. With the second shading corrector 305 being used, the output luminance has a value from "200" to "250" if the input luminance is in the white-paper level and has the value "Vmax (255)" if the input luminance is in the correction fluid trace level. Accordingly, performing arithmetic processing for the input luminance by using the input-output characteristic of the second shading corrector 305 can separate the input luminance into the white-paper level and the correction fluid trace level. The gamma correction by using the input-output characteristic of the second shading corrector 305 may be performed as preprocessing for the first shading corrector 304 to separate the input luminance into the white-paper level and the correction fluid trace level. Alternatively, the gamma correction by using the input-output characteristic of the second shading corrector 305 may be performed in a gamma corrector in the image processor 306 to separate the input luminance into the white-paper level and the correction fluid trace level.

Referring back to FIG. 18, in Step S1806, the output luminance value V3 in consideration of the white-paper reference value from the first shading corrector 304 is subjected to the image processing in the image processor 306 in a mode selected by the user. Since the image processing in the image processor 306 is irrelevant to the nature of the present invention, a detailed description is omitted herein. The image processor 306 generally performs the edge enhancement, the gamma correction, etc. in order to provide a high-quality image.

In contrast, in Step S1806, the image output from the second shading corrector 305 is checked for any correction fluid trace in the correction detector 307. Two exemplary methods of detecting any correction fluid trace will be described.

EXAMPLE 1 OF DETECTION METHOD (PART OF S1806)

Figure 7:
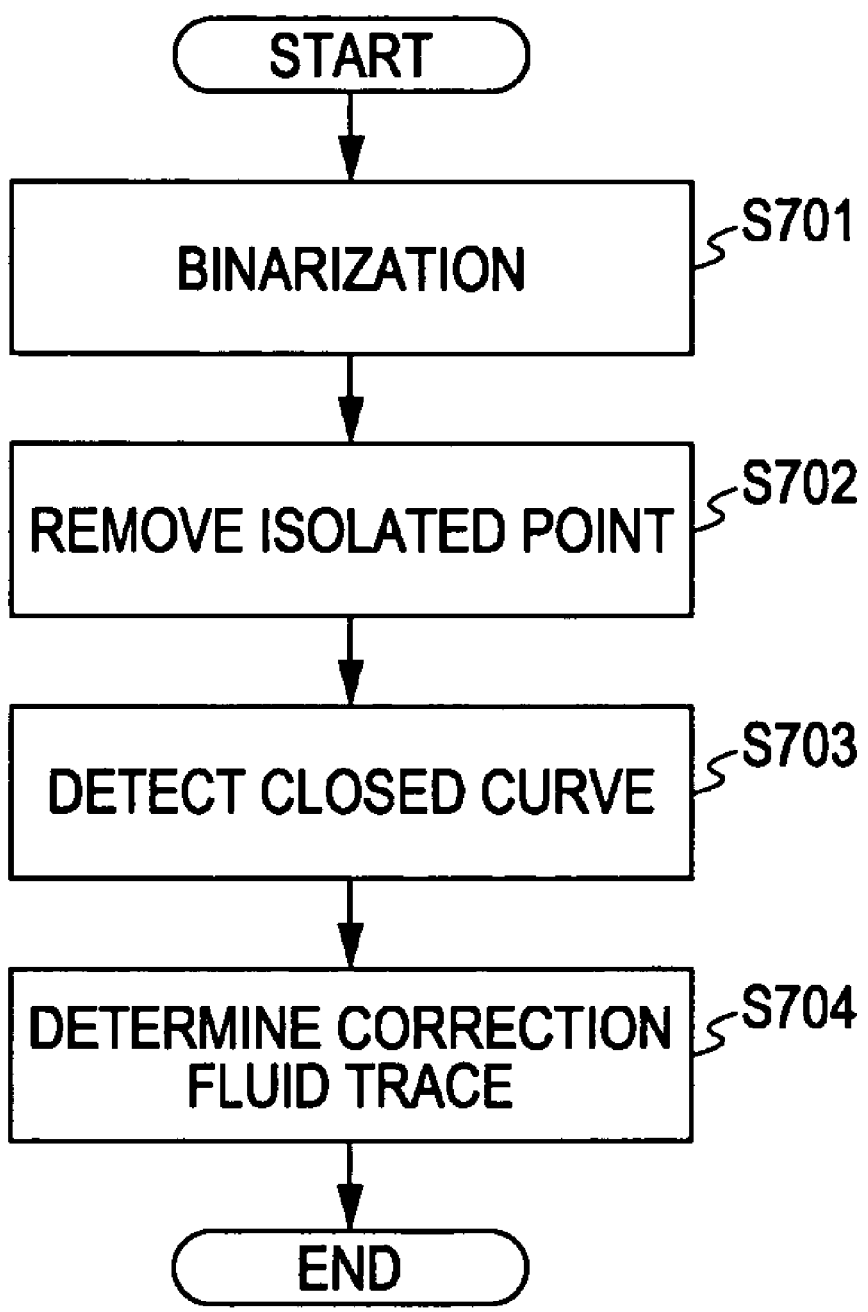
FIG. 7 is a flowchart showing a first example of a method of detecting any correction fluid trace to which the present invention is applicable.

FIG. 7 is a flowchart showing a first example of the method of detecting any correction fluid trace, according to the first exemplary embodiment. As described above with reference to FIG. 6, the white correction fluid is detected in an area having the output luminance level reaching "255". Accordingly, referring to FIG. 7, in Step S701, the controller 312 performs simple binarization for the image output from the second shading corrector 305 by using "255" or "255-α" (α is a value that can be set) as a threshold value. In this binarization, "1" represents a pixel read from a correction fluid trace portion and "0" represents a pixel read from a non-correction fluid trace portion. An example of the image binarized in Step S701 is shown in FIG. 8B.

In Step S702, the controller 312 removes any isolated point, which is considered not to be the correction fluid trace. The isolated point is produced due to a noise or dust. The isolated point is removed in order to prevent the non-correction-fluid part from being determined as the pixels read from a correction fluid trace portion.

The detection of the correction fluid trace will be described. In Step S703, the controller 312 detects a closed curve, which is a boundary between the correction fluid portion and the non-correction-fluid portion. FIG. 9 illustrates how to detect the closed curve in Step S703 in the detection of the correction fluid trace according to the first exemplary embodiment.

Referring to FIG. 9, the controller 312 scans in the main scanning direction to search for a first pixel read from a correction fluid trace portion. Since the pixels read from a correction fluid trace portion draw a boundary between the pixels read from a correction fluid trace portion and the pixels read from a non-correction fluid trace portion, the controller 312 checks peripheral pixels if "1" is detected. In the example in FIG. 9, the upper, upper right, left, upper left, and lower left pixels with respect to the first target pixel are the pixels read from a non-correction fluid trace portion, while the right, lower right, and lower pixels with respect to the first target pixel are the pixels read from a correction fluid trace portion. Accordingly, the right or lower pixel (on the boundary) with reference to the first target pixel is made a second target pixel. Such processing is repeated to scan the edge of the correction fluid portion, that is, the boundary between the pixels read from a correction fluid trace portion and the pixels read from a non-correction fluid trace portion. When the target pixel returns to the first target pixel, the trail of the target pixels that have been scanned corresponds to the edge of the correction fluid portion and the pixels read from a correction fluid trace portion exist inside the edge. This processing is performed for all the areas in the image.

In Step S704, the controller 312 determines information concerning the correction fluid trace. Specifically, since an area having a smaller number of continuous pixels on the trail, that is, a small correction fluid portion is unlikely to be corrected even if the correction fluid is applied and can be processed similarly to the isolated point, such an area is considered as the non-correction-fluid portion. In contrast, an area in which the continuous length of the edge of the correction fluid is too long is not probably produced in normal use of the correction fluid and, therefore, a special sheet of paper having a higher luminance is possibly used. Hence, such a sheet of paper is considered as the correction fluid portion to generate information concerning the correction fluid. The threshold value of the continuous length is made possible to be set as a parameter. After the information concerning the correction fluid portion has been generated for one page, the information is supplied to the synthesizer 308.

EXAMPLE 2 OF DETECTION METHOD (PART OF S1806)

Figure 10:
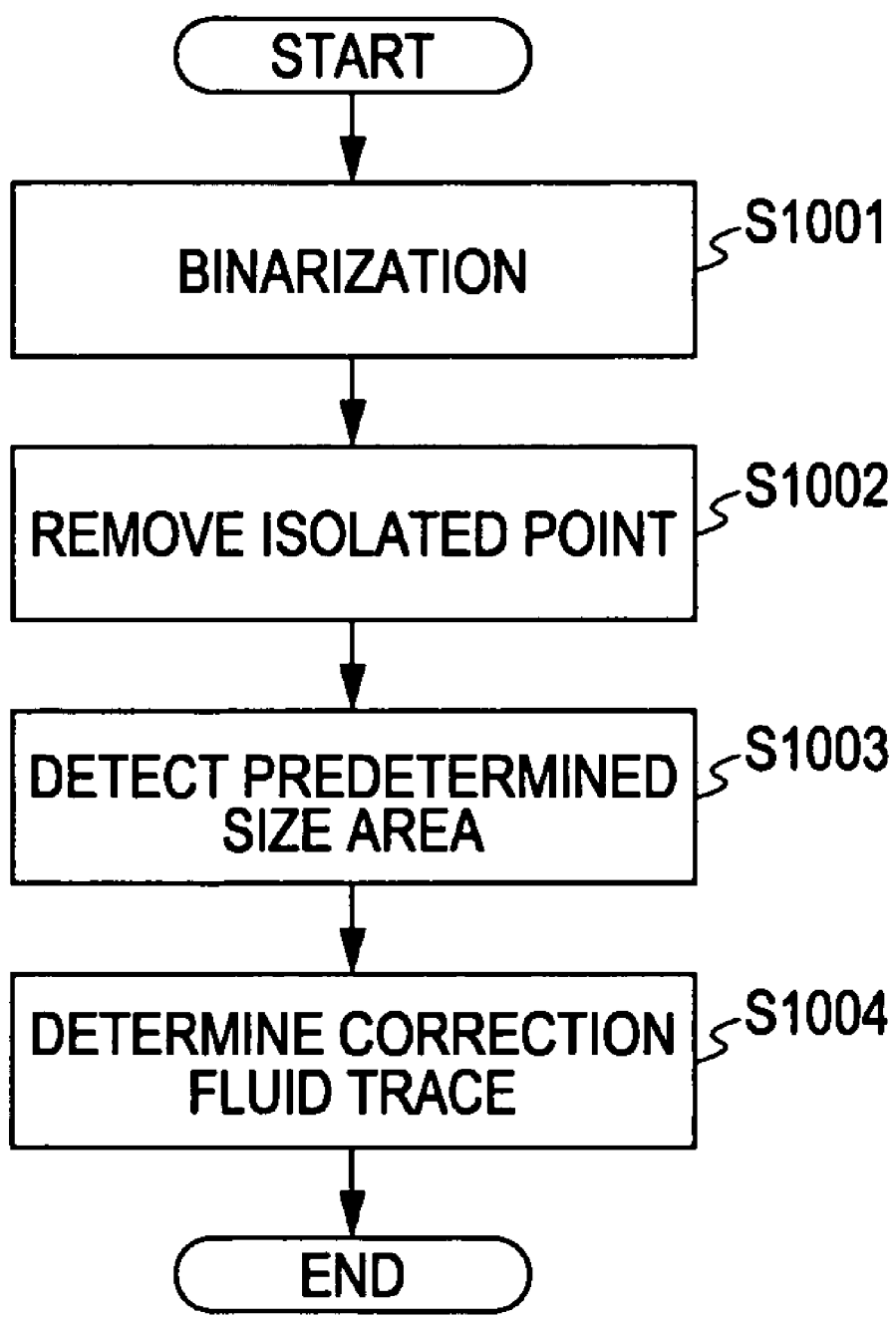
FIG. 10 is a flowchart showing a second example of the method of detecting any correction fluid trace, to which the present invention is applicable.

FIG. 10 is a flowchart showing a second example of the method of detecting any correction fluid trace, according to the first exemplary embodiment. As described above with reference to FIG. 6, the white correction fluid is detected in an area having the output luminance level reaching "255".

Accordingly, referring to FIG. 10, in Step S1001, the controller 312 performs the simple binarization for the image output from the second shading corrector 305 by using "255" or "255-α" (α is a value that can be set) as a threshold value. In this binarization, "1" represents a pixel read from a correction fluid trace portion and "0" represents a pixel read from a non-correction fluid trace portion. An example of the image binarized in Step S1001 is shown in FIG. 8B.

In Step S1002, the controller 312 removes any isolated point, which is considered not to be the correction fluid trace. The isolated point is produced due to a noise or dust. The isolated point is removed in order to prevent the non-correction-fluid part from being determined as the pixels read from a correction fluid trace portion.

The detection of the correction fluid trace will be described. In Step S1003, the controller 312 detects a predetermined size area of the correction fluid. FIGS. 11A and 11B illustrate how to detect the predetermined size area in Step S1003 in the detection of the correction fluid trace according to the first exemplary embodiment. If the binary signals shown FIGS. 11A and 11B have been detected, the controller 312 measures the continuous quantities of the correction fluid portion (the pixels having the value "1" in FIGS. 11A and 11B) in the main scanning direction and in a secondary scanning direction. This measurement is performed for all the areas in the image.

In Step S1004, the controller 312 determines information concerning the correction fluid trace. Specifically, an area in which the continuous quantities of the correction fluid portion in the main scanning direction and in the secondary scanning direction exceed a predetermined amount is determined as the predetermined size area of the correction fluid. In contrast, an area in which the continuous quantities of the correction fluid portion in the main scanning direction and in the secondary scanning direction do not exceed the predetermined amount is considered not to be the predetermined size area of the correction fluid. Such an area is processed similarly to the isolated point due to a noise or dust and is processed as the non-correction-fluid-trace area.

Referring to FIGS. 11A and 11B, the large central area is considered as the correction fluid trace area, and the small lower-right area is considered as the isolated area and is processed as the non-correction-fluid-trace area. All the areas having the value "0" are the non-correction-fluid-trace areas. The threshold value of the continuous quantities is made possible to be set as a parameter. After the information concerning the correction fluid portion has been generated for one page, the information is supplied to the synthesizer 308.

EXAMPLE 1 OF IMAGE SYNTHESIZING
(S1807)

Referring back to FIG. 18, the image and the information concerning the correction fluid trace are generated through the steps from Step S1801 to S1806, and the image is synthesized with the information concerning the correction fluid trace in the synthesizer 308. In Step S1807, a first example of image synthesizing is performed in the synthesizer 308. The image subjected to the appropriate image processing in the image processor 306 is supplied to the synthesizer 308. In addition, the information concerning the correction fluid trace, detected in the correction detector 307, is also supplied to the synthesizer 308.

The synthesizer 308 synthesizes the image supplied from the image processor 306 with the information concerning the correction fluid trace, supplied from the correction detector 307. The luminance of pixels on the edge of the correction fluid trace is set to "0" to draw a black frame line, which is visible to the third person.

EXAMPLE 2 OF IMAGE SYNTHESIZING
(S1807)

The image and the information concerning the correction fluid trace are generated through the steps from Step S1801 to S1806, and the image is synthesized with the information concerning the correction fluid trace in the synthesizer 308. In Step S1807, a second example of the image synthesizing is performed in the synthesizer 308. The image subjected to the appropriate image processing in the image processor 306 is supplied to the synthesizer 308. In addition, the information concerning the correction fluid trace, detected in the correction detector 307, is also supplied to the synthesizer 308.

The synthesizer 308 embeds the information concerning the correction fluid trace, supplied from the correction detector 307, in the image supplied from the image processor 306 as a digital watermark. Specifically, the image supplied from the image processor 306 is subjected to Fourier transform to be converted into frequency information. The frequency information is synthesized with the information concerning the correction fluid trace, supplied from the correction detector 307. Then, the frequency information synthesized with the information concerning the correction fluid trace is subjected to inversed Fourier transform to be returned to the original image. Since the above operation diffuses the information concerning the correction fluid trace in the image, it is not possible to extract the information concerning the correction fluid trace without a special analysis.

[Exemplary Post-Processing]

"Example 1 of Detection Method" or "Example 2 of Detection Method" is combined with "Example 1 of Image Synthesizing" or "Example 2 of Image Synthesizing" to generate a digital output image according to the first exemplary embodiment.

After the above steps are finished, then in Step S1808, the controller 312 stores the digital output image in the image storage area 311. The controller 312 transfers the digital output image to a personal computer or the like through the network controller 310 and over a network. The controller 312 may supply the digital output image to the recording unit 313 to print the image. If the image includes the correction fluid trace, the controller 312 issues a warning to the user through the user interface 309. If no correction fluid trace has been detected, the controller 312 may attach a trace certifying that no correction fluid trace is detected to the image.

Second Exemplary Embodiment

According to the first exemplary embodiment, the correction detector 307 uses the output from the second shading corrector 305 to detect any correction fluid trace and outputs positional information of the corrected portion or the corrected image.

In contrast, according to a second exemplary embodiment, a correction detector uses the outputs from a first shading corrector and a second shading corrector to detect any correction fluid trace and outputs positional information of the corrected portion or the corrected image.

[Exemplary Configuration]

Figure 12:
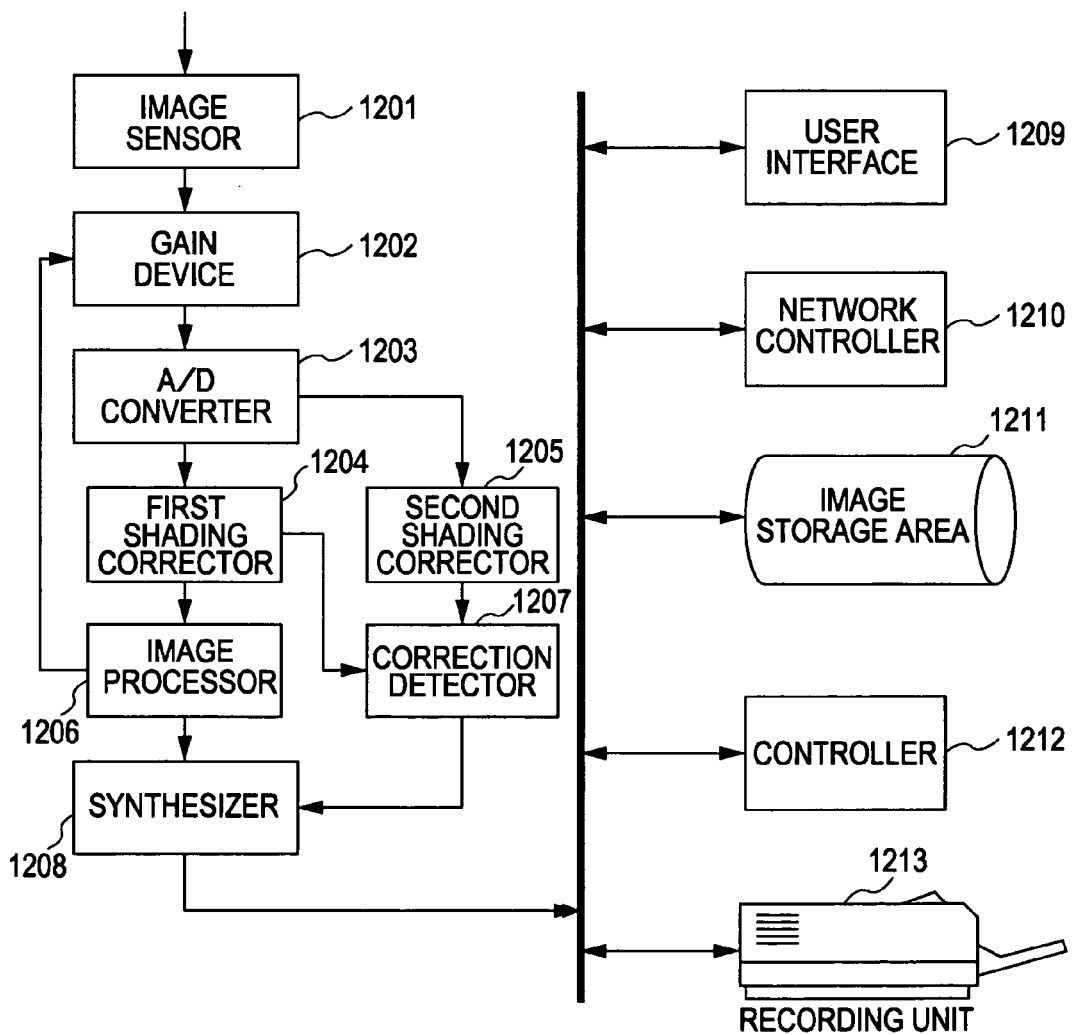
FIG. 12 is a block diagram showing an example of the configuration of an image forming apparatus according to a second exemplary embodiment of the present invention.

FIG. 12 is a block diagram showing an example of the configuration of an image forming apparatus according to the second exemplary embodiment of the present invention. An image sensor 1201 converts an image of a document into a voltage. A gain device 1202 applies a gain to the voltage of the image sensor 1201, which voltage is increased to a desired voltage. An A/D converter 1203 converts the voltage into digital information. A first shading corrector 1204 is used for yielding a correct image luminance by a common method. A second shading corrector 1205 performs the shading correction in consideration of the luminance of the correction fluid.

An image processor 1206 performs image processing for the information supplied from the first shading corrector 1204 to yield a fine image. The image processor 1206 performs, for example, the edge enhancement and the unsharp mask for finely displaying characters, the Moire correction for reducing Moire patterns, and/or the change of resolution and the gamma correction according to a user's preference. However, since these processes are well-known, a detailed description is omitted herein. If the gain adjustment etc. are automatically performed, the image processor 1206 may control the gain device 1202.

A correction detector 1207 uses the outputs from the first shading corrector 1204 and the second shading corrector 1205 to detect any correction fluid trace and outputs positional information of the corrected portion or the corrected image. A synthesizer 1208 synthesizes the information detected by the correction detector 1207 with the image supplied from the image processor 1206. The image forming apparatus in FIG. 12 includes an image scanning unit including the components from the image sensor 1201 to the synthesizer 1208.

A user interface 1209 is a panel which is used by the user to operate the image forming apparatus according to the second exemplary embodiment and in which information is displayed. A network controller 1210 is used when the image forming apparatus according to the second exemplary embodiment processes the image information and/or tasks including printing in cooperation with an external device, such as a PC, over a LAN or via a USB. An image storage area 1211 has the image information temporarily stored therein. A controller 1212 controls the entire image forming apparatus according to the second exemplary embodiment, and includes a CPU that performs the image processing and programs used by the CPU to operate in accordance with a process shown in FIG. 19. A recording unit 1213 is used for printing the image information when the user selects the copying or printing in the image forming apparatus according to the second exemplary embodiment.

FIG. 4 illustrates a button operation unit on an operation panel connected to the user interface 1209. Reference numeral 401 denotes a liquid crystal display, reference numeral 402 denotes a start button, and reference numeral 403 denotes a button section. The buttons in the button operation unit are used to determine a functional mode in the image forming apparatus according to the second exemplary embodiment.

[Exemplary Operation]

Figure 19:
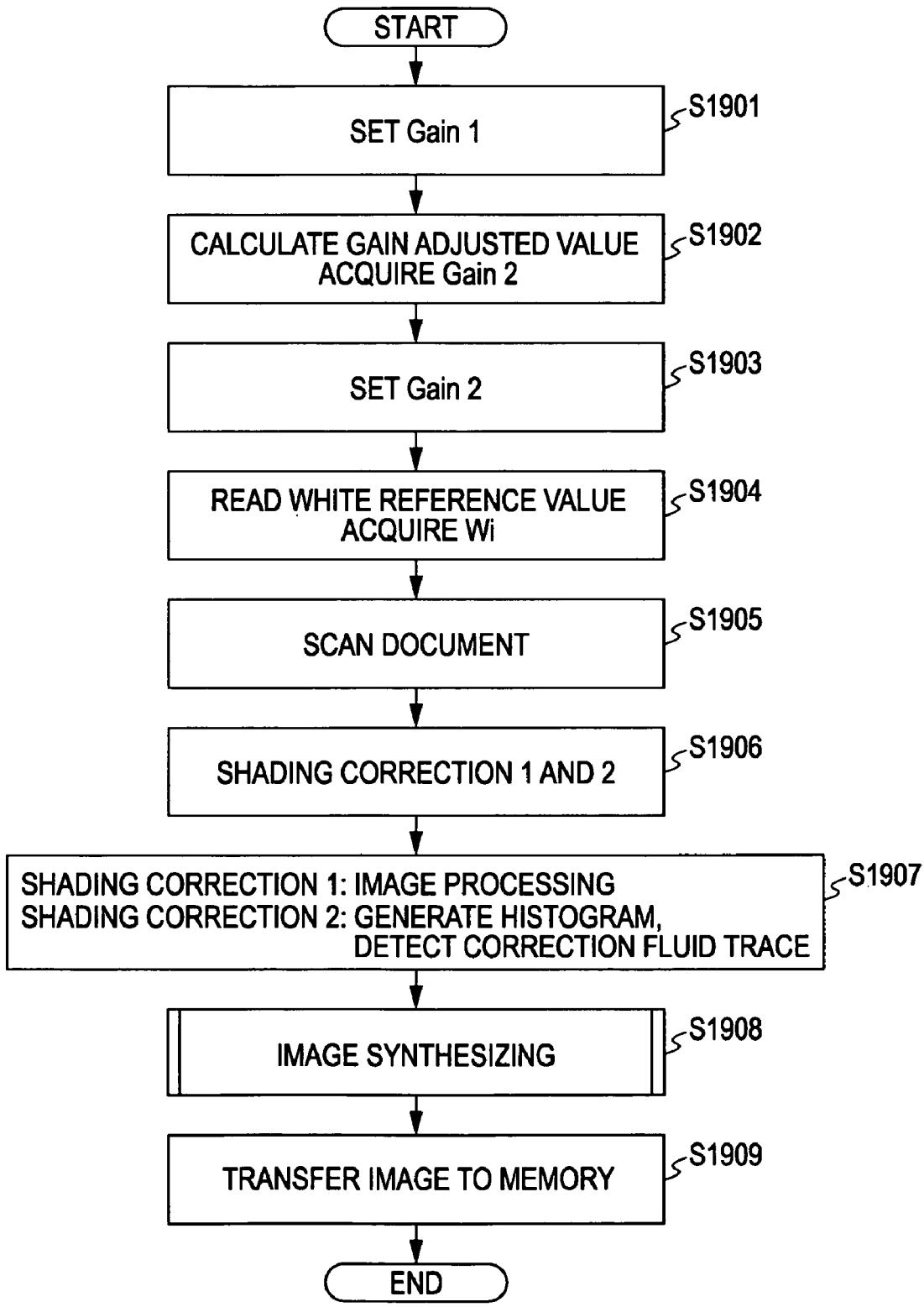
FIG. 19 is a flowchart showing a process in the image forming apparatus according to the second exemplary embodiment.

FIG. 19 is a flowchart showing a process in the image forming apparatus according to the second exemplary embodiment. The process in the image forming apparatus having the configuration described above will be described in detail with reference to FIGS. 12 and 19. A case where the user selects electronic imaging in a public record mode by operating the button section 403 in the button operation unit on the operation panel, in FIG. 4, connected to the user interface 1209, will be described.

The controller 1212 starts to read an image on the basis of the operational information supplied from the user interface 1209. In Step S1901, the controller 1212 causes the image sensor 1201 to read a white reference value in a state in which an image having a higher luminance can be read, that is, in a state in which a small amount of gain (Gain 1) is set in the gain device 1202, to obtain the voltage of the white reference value. The white reference value is generally a value of a white plate mounted to a reader. The image having the white reference value is given a small amount of gain in the gain device 1202 and is digitized in the A/D converter 1203 to generate a digital image before the gain adjustment.

The image processor 1206 under the control of the controller 1212 or the controller 1212 detects luminance information E1 (reference numeral E hereinafter denotes a voltage) producing a maximum luminance, in the digital image before the gain adjustment, to calculate a gain used for actually reading an image of a document according to the following equation.

$$\text{Gain } 2 = E2 \times \text{Gain } 1/E1 \qquad \text{[Formula 5]}$$

where, for example, "2.8", is substituted for E2 if the output level of the white reference value is set to 2.8 V.

In Step S1902, Gain 2 is adjusted such that the voltage E2 when the luminance of the correction fluid is read is within the range of the input voltage of the A/D converter 1203. In Step S1903, Gain 2 that is adjusted is set in the gain device 1202. In Step S1904, the image sensor 1201 reads the white reference value again. Gain 2 is applied to the voltage of the read image in the gain device 1202, and the image is converted into digital information for every pixel in the A/D converter 1203. After the conversion into the digital information, shading correction data Wi (i denotes a position in the main scanning direction) is acquired in the first shading corrector 1204 or the second shading corrector 1205.

In Step S1905, the image sensor 1201 scans a document set by the user. The gain device 1202 applies Gain 2 to the analog image, which is scanned by the image sensor 1201 and has a voltage converted for every pixel in the document, and the analog image has the voltage E2. The analog image having the voltage E2 is converted into a digital image V2 (V hereinafter denotes a luminance) in the A/D converter 1203, and the digital image is supplied to the first shading corrector 1204 and the second shading corrector 1205.

First, the operation of the first shading corrector 1204 in Step S1906 will be described. In order to read an image having a higher quality, the shading correction is performed in the first shading corrector 1204 according to Formula 6.

$$V\_\text{shd } 1\ (i,j) = C1 * V\_2(i,j)/Wi \qquad \text{[Formula 6]}$$

where i denotes a position in the main scanning direction, j denotes a position in the secondary scanning direction, C1 denotes a first shading correction coefficient, V_shd 1 (i,j) denotes the luminance of a digital image signal of the (i,j)-th pixel after the shading correction, V_2 (i,j) denotes the luminance of a digital image signal of the (i,j)-th pixel before the shading correction, and Wi denotes the shading correction data.

Generally, in the 8-bit grayscale, it is necessary to perform the shading correction such that the output level of the white paper, which is the background, becomes about "255". Accordingly, the first shading correction coefficient C1 is adjusted with respect to the white-paper reference value. The adjustment of the luminance level from the gain adjustment to the shading correction is performed in the same manner as in the related art, described above with reference to FIGS. 2A to 2C.

Next, the operation of the second shading corrector 1205 in Step S1906 will be described. The shading correction in consideration of the white paper, which is the background, and the correction fluid is performed in the second shading corrector 1205 according to Formula 7.

$$V\_shd\ 2\ (i,j) = C2 * V\_2(i,j)/Wi \qquad \text{[Formula 7]}$$

where
i denotes a position in the main scanning direction,
j denotes a position in the secondary scanning direction,
C2 denotes a second shading correction coefficient,
V_shd 2 (i,j) denotes the luminance of a digital image signal of the (i,j)-th pixel after the shading correction,
V_2 (i,j) denotes the luminance of a digital image signal of the (i,j)-th pixel before the shading correction, and
Wi denotes the shading correction data.

The target of the second shading correction coefficient C2 is the correction fluid trace having a luminance higher than that of the white paper. Here, the second shading correction coefficient C2 is adjusted such that both the luminance of the correction fluid trace and the luminance of the white paper do not reach "255".

Figure 13:
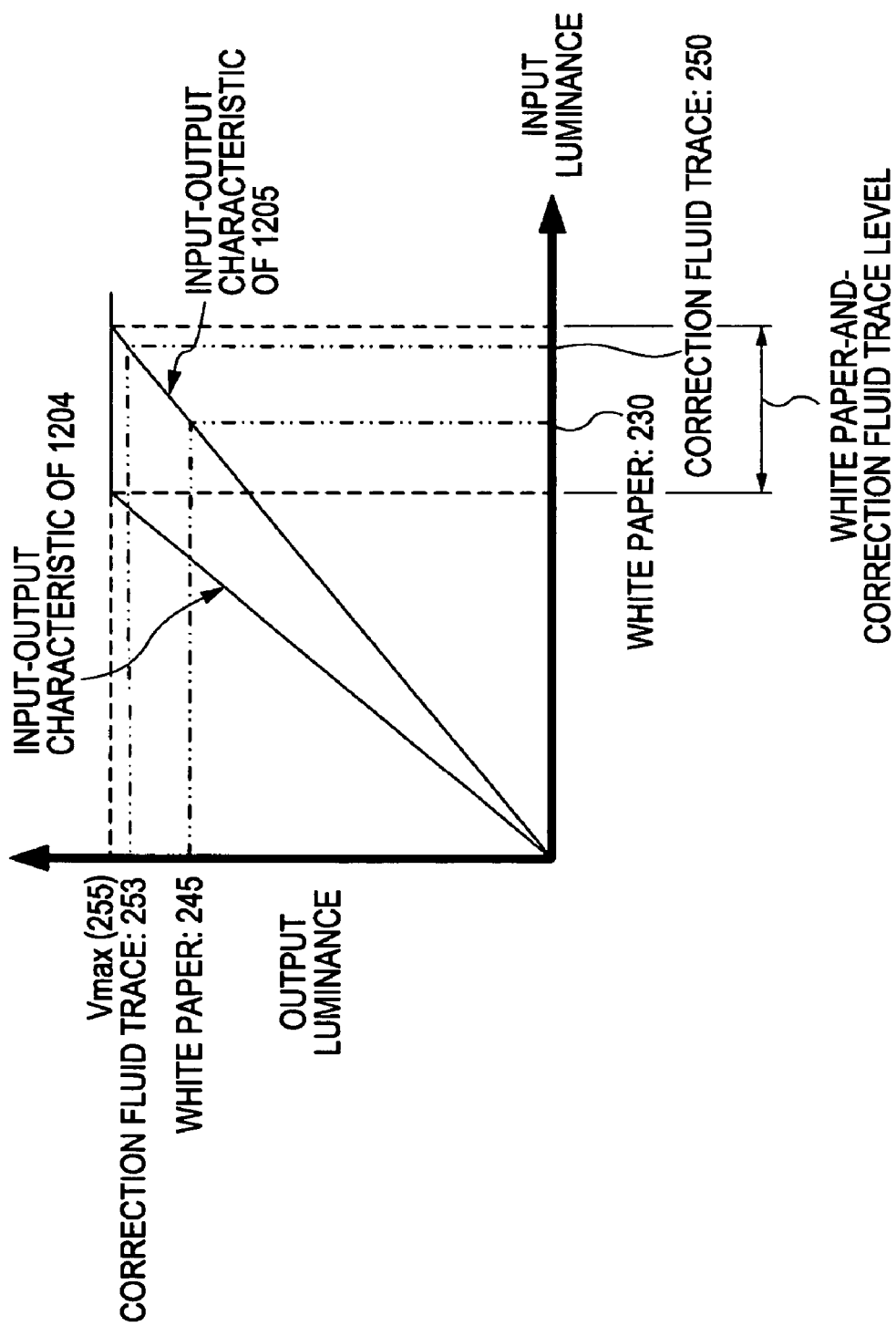
FIG. 13 illustrates the relationship between the input luminance and the output luminance, in a first shading corrector and a second shading corrector, according to the second embodiment of the present invention.

FIG. 13 illustrates the relationship between the input luminance and the output luminance, in the first shading corrector 1204 using the first shading correction coefficient C1 and the second shading corrector 1205 using the second shading correction coefficient C2. Referring to FIG. 13, in the first shading corrector 1204, the output luminance reaches "255" both at the input luminance "230" of the white paper and at the input luminance "250" of the correction fluid trace. In contrast, in the second shading corrector 1205, the output luminance is equal to "245" at the input luminance "230" of the white paper and the output luminance is equal to "253" (average value) at the input luminance "250" of the correction fluid trace. In both cases, the output luminance does not reach "255".

Referring back to FIG. 19, in Step S1907, the output luminance value V_shd 1 in consideration of the white-paper reference value from the first shading corrector 1204 is subjected to the image processing in the image processor 1206 in a mode selected by the user. Since the image processing in the image processor 1206 is irrelevant to the nature of the present invention, a detailed description is omitted herein. The image processor 1206 generally performs the edge enhancement, the gamma correction, etc. in order to provide a high-quality image.

In addition, in Step S1907, the image output from the first shading corrector 1204 and the image output from the second shading corrector 1205 are checked for any correction fluid trace in the correction detector 1207. An exemplary method of detecting any correction fluid trace will be described.

Figure 14:
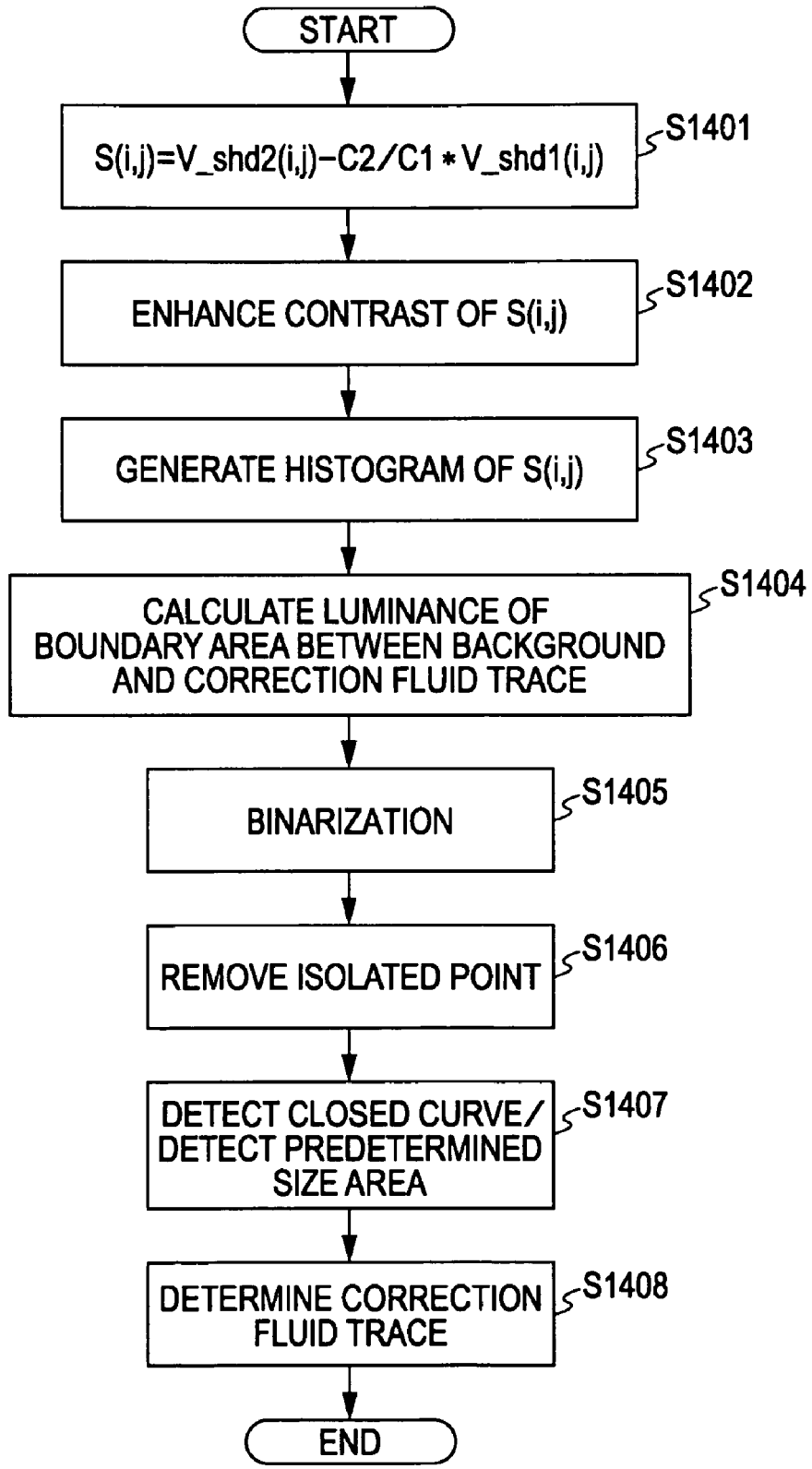
FIG. 14 is a flowchart showing an example of a method of detecting any correction fluid trace, according to the second exemplary embodiment.

FIG. 14 is a flowchart showing an example of the method of detecting any correction fluid trace (part of Step S1907), according to the second exemplary embodiment. In Step S1401, the controller 1212 applies the following equation to the processing of all the pixels.

$$S(i,j) = V\_shd\ 2\ (i,j) - C2/C1 \times V\_shd\ 1\ (i,j) \qquad \text{[Formula 8]}$$

The use of Formula 8 causes only the white paper-and-correction fluid trace level in FIG. 13 to have the value S(i,j). In Step S1402, the controller 1212 enhances the contrast of the luminance S(i,j) to broaden the boundary area between the white paper level and the correction fluid trace level. In Step S1403, the controller 1212 generates a histogram indicating the number of pixels of the luminance S(i,j). In Step S1404, the controller 1212 uses the generated histogram to calculate a luminance of the boundary area between the white paper area and the correction fluid trace area as a border line (binary threshold value) between the background and the correction fluid trace (described below with reference to FIGS. 15A and 15B).

In Step S1405, the controller 1212 performs the simple binarization for the image output from the second shading corrector 1205 by using the above binary threshold value. Here, "1" represents a pixel read from a correction fluid trace portion and "0" represents a pixel read from a non-correction fluid trace portion.

Figure 15A:
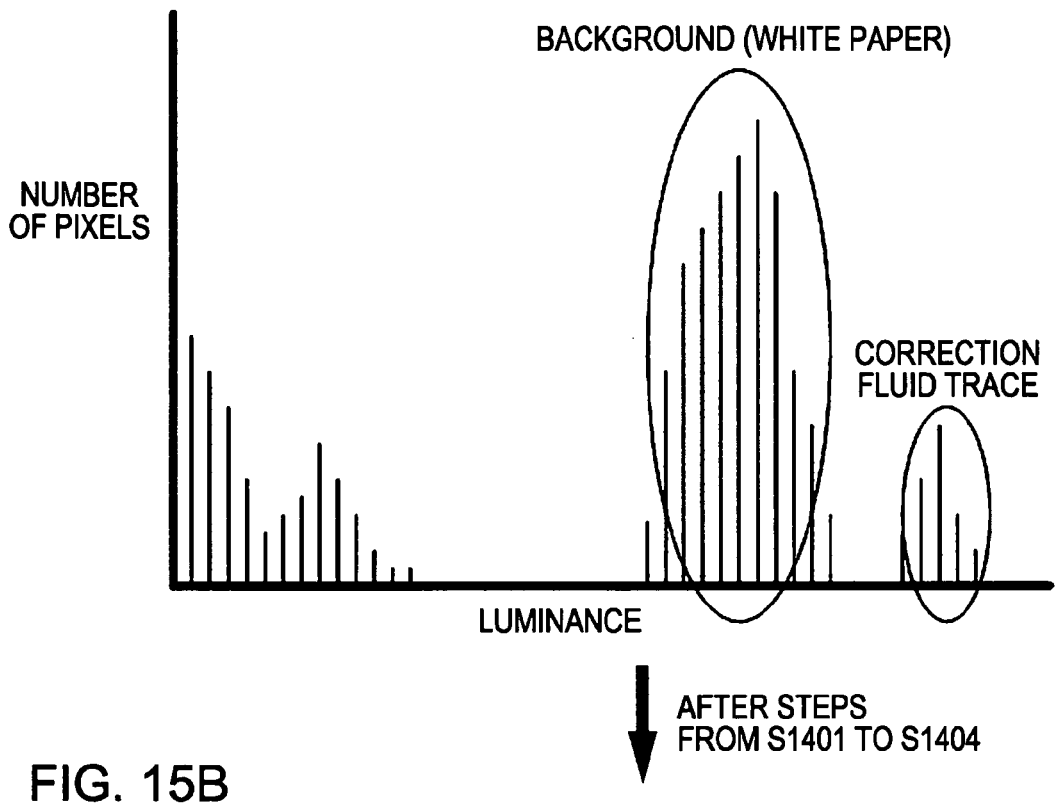
FIGS. 15A and 15B show exemplary histograms representing a processed image according to the second embodiment of the present invention.
Figure 15B:
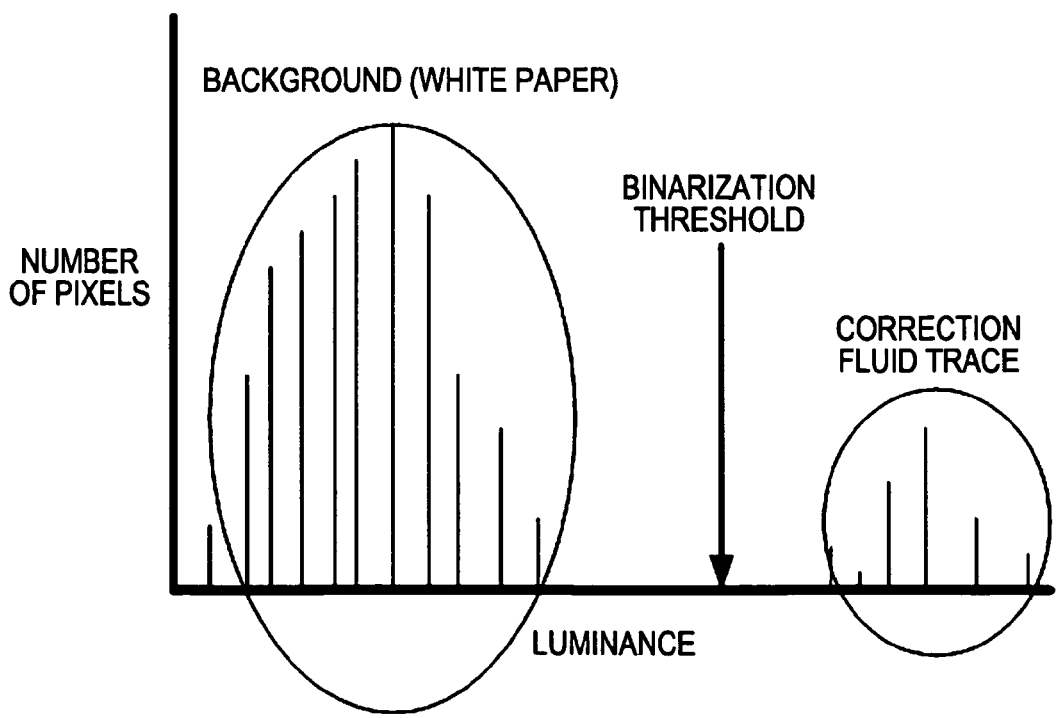

FIGS. 15A and 15B show histograms representing the image processed in the steps from S1401 to S1404. In the histogram in FIG. 15A showing "V_shd 2" before the processing, the image portion exists in a lower luminance area and the white paper area and the correction fluid area exist in higher luminance areas. In contrast, in the histogram in FIG. 15B showing "V_shd 2" after the processing from S1401 to S1404, the correction fluid area and the white paper area remain in a high-contrast state and, therefore, it becomes easy to calculate the binary threshold value.

In Step S1406, the controller 1212 removes any isolated point, which is considered not to be the correction fluid trace. The isolated point is produced due to a noise or dust. The isolated point is removed in order to prevent the non-correction-fluid part from being determined as the pixels read from a correction fluid trace portion.

The detection of the correction fluid trace will now be described. The correction fluid trace can be detected by a method of detecting a closed curve or by a method of detecting a predetermined size area.

[Exemplary Method of Detecting Closed Curve]

In S1407, the controller 1212 detects a closed curve, which is a boundary between the correction fluid portion and the non-correction-fluid portion. FIG. 9 illustrates how to detect the closed curve in Step S1407 in the detection of the correction fluid trace according to the second exemplary embodiment. Referring to FIG. 9, the controller 1212 scans in the main scanning direction to search for a first pixel read from a correction fluid trace portion. Since the pixels read from a correction fluid trace portion draw a boundary between the pixels read from a correction fluid trace portion and the pixels read from a non-correction fluid trace portion, the controller 1212 checks peripheral pixels if "1" is detected. In the example in FIG. 9, the upper, upper right, left, upper left, and lower left pixels with respect to the first target pixel are the pixels read from a non-correction fluid trace portion, while the right, lower right, and lower pixels with respect to the first target pixel are the pixels read from a correction fluid trace portion. Accordingly, the right or lower pixel (on the boundary) with reference to the first target pixel is made a second target pixel. Such processing is repeated to scan the edge of the correction fluid portion, that is, the boundary between the pixels read from a correction fluid trace portion and the pixels read from a non-correction fluid trace portion. When the target pixel returns to the first target pixel, the trail of the target pixels that have been scanned corresponds to the edge of the correction fluid portion and the pixels read from a correction fluid trace portion exist inside the edge. This processing is performed for all the areas in the image.

In Step S1408, the controller 1212 determines the correction fluid trace. Specifically, since an area having a smaller number of continuous pixels on the trail, that is, a small correction fluid portion is unlikely to be corrected even if the correction fluid is applied and can be processed similarly to the isolated point, such an area is considered as the non-correction-fluid portion. In contrast, an area in which the continuous length of the edge of the correction fluid is too long is not probably produced in normal use of the correction fluid and, therefore, a special sheet of paper having a higher luminance is possibly used. Hence, such a sheet of paper is considered as the correction fluid portion to generate information concerning the correction fluid. The threshold value of the continuous length is made possible to be set as a parameter. After the information concerning the correction fluid portion has been generated for one page, the information is supplied to the synthesizer 1208.

[Method of Detecting A Predetermined Size Area]

In Step S1407, the controller 1212 detects a predetermined size area of the correction fluid. FIGS. 11A and 11B illustrate how to detect the predetermined size area in Step S1407 in the detection of the correction fluid trace according to the second exemplary embodiment. If the binary signals shown FIGS. 11A and 11B have been detected, the controller 1212 measures the continuous quantities of the correction fluid portion (the pixels having the value "1" in FIGS. 11A and 11B) in the main scanning direction and in the secondary scanning direction. This measurement is performed for all the areas in the image.

In Step S1408, the controller 1212 determines the correction fluid trace. Specifically, an area in which the continuous quantities of the correction fluid portion in the main scanning direction and in the secondary scanning direction exceed a predetermined amount is determined as the predetermined size area of the correction fluid. In contrast, an area in which the continuous quantities of the correction fluid portion in the main scanning direction and in the secondary scanning direction do not exceed the predetermined amount is considered not to be the predetermined size area of the correction fluid. Such an area is processed similarly to the isolated point due to a noise or dust and is processed as the non-correction-fluid-trace area.

Referring back to FIGS. 11A and 11B, the large central area is considered as the correction fluid trace area, and the small lower-right area is considered as the isolated area and is processed as the non-correction-fluid-trace area. All the areas having the value "0" are the non-correction-fluid-trace areas. The threshold value of the continuous quantities is made possible to be set as a parameter. After the information concerning the correction fluid portion has been generated for one page, the information is supplied to the synthesizer 1208.

EXAMPLE 1 OF IMAGE SYNTHESIZING (S1908)

Now referring back to FIG. 19, the image and the information concerning the correction fluid trace are generated through the steps from Step S1901 to S1907, and the image is synthesized with the information concerning the correction fluid trace in the synthesizer 1208. In Step S1908, a first example of image synthesizing is performed in the synthesizer 1208. The image subjected to the appropriate image processing in the image processor 1206 is supplied to the synthesizer 1208. In addition, the information concerning the correction fluid trace, detected in the correction detector 1207, is also supplied to the synthesizer 1208.

The synthesizer 1208 synthesizes the image supplied from the image processor 1206 with the information concerning the correction fluid trace, supplied from the correction detector 1207. The luminance of pixels on the edge of the correction fluid trace is set to "0" to draw a black frame line, which is visible to the third person.

EXAMPLE 2 OF IMAGE SYNTHESIZING (S1908)

The image and the information concerning the correction fluid trace are generated through the steps from Step S1901 to S1907, and the image is synthesized with the information concerning the correction fluid trace in the synthesizer 1208. In Step S1908, a second example of the image synthesizing is performed in the synthesizer 1208. The image subjected to the appropriate image processing in the image processor 1206 is supplied to the synthesizer 1208. In addition, the information concerning the correction fluid trace, detected in the correction detector 1207, is also supplied to the synthesizer 1208.

The synthesizer 1208 embeds the information concerning the correction fluid trace, supplied from the correction detector 1207, in the image supplied from the image processor 1206 as a digital watermark. Specifically, the image supplied from the image processor 1206 is subjected to Fourier transform to be converted into frequency information. The frequency information is synthesized with the information concerning the correction fluid trace, supplied from the correction detector 1207. Then, the frequency information synthesized with the information concerning the correction fluid trace is subjected to inversed Fourier transform to be returned to the original image. Since the above operation diffuses the information concerning the correction fluid trace in the image, it is not possible to extract the information concerning the correction fluid trace without a special analysis.

[Exemplary Post-processing]

Here, the "Method of Detecting Closed Curve" or "Method of Detecting Predetermined Size Area" is combined with "Example 1 of Image Synthesizing" or "Example 2 of Image Synthesizing" to generate a digital output image according to the second exemplary embodiment.

After the above steps are finished, then in Step S1909, the controller 1212 stores the digital output image in the image storage area 1211. The controller 1212 transfers the digital output image to a personal computer or the like through the network controller 1210 and over a network. The controller 1212 may supply the digital output image to the recording unit 1212 to print the image. If the image includes the correction fluid trace, the controller 1212 issues a warning to the user through the user interface 1209. If no correction fluid trace has been detected, the controller 1212 may attach a trace certifying that no correction fluid trace is detected to the image.

Third Exemplary Embodiment

According to the first exemplary embodiment, the correction detector 307 uses the output from the second shading corrector 305 to detect any correction fluid trace and outputs positional information of the corrected portion or the corrected image.

In contrast, according to a third exemplary embodiment, the second scan output from one shading corrector is used to detect any correction fluid trace and outputs positional information of the corrected portion or the corrected image.

[Exemplary Configuration]

Figure 16:
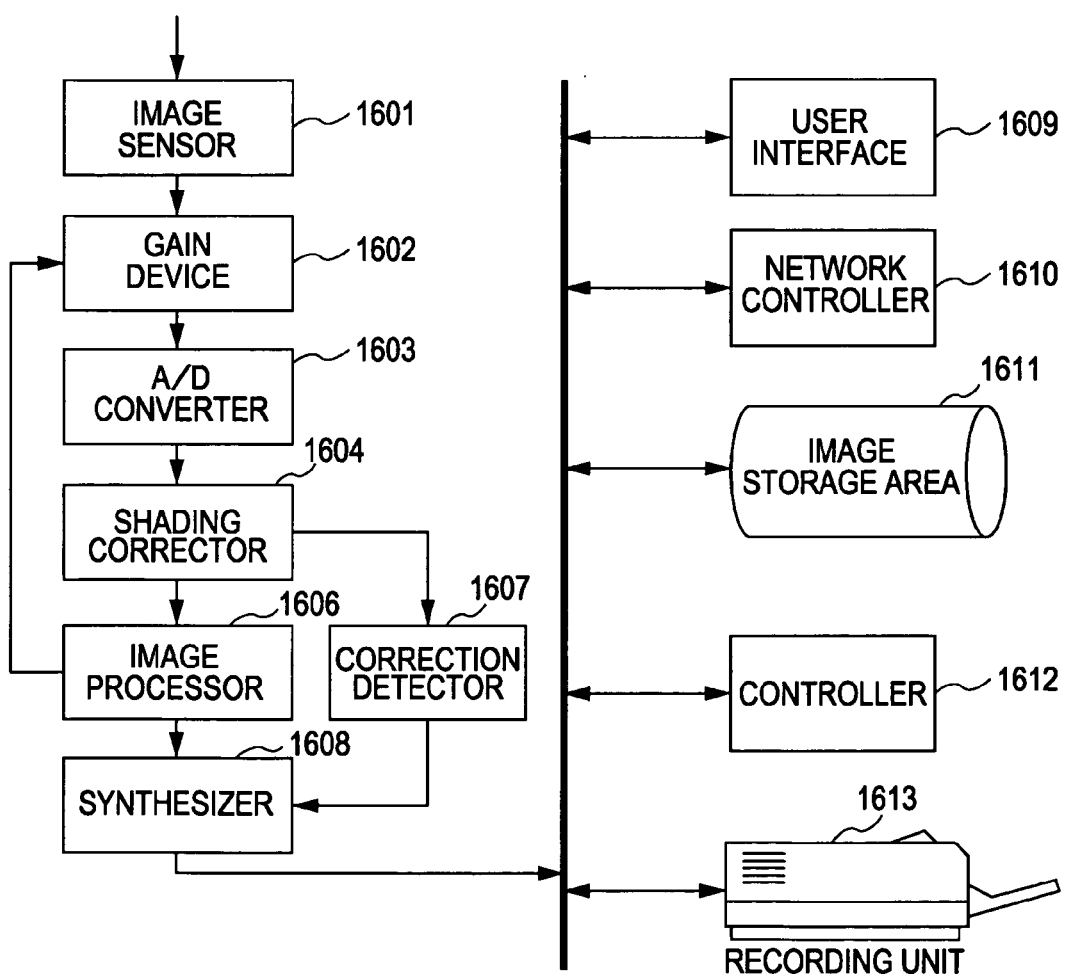
FIG. 16 is a block diagram showing an example of the configuration of an image forming apparatus according to a third exemplary embodiment of the present invention.

FIG. 16 is a block diagram showing an example of the configuration of an image forming apparatus according to the third exemplary embodiment of the present invention. Referring to FIG. 16, an image sensor 1601 converts an image of a document into a voltage. A gain device 1602 applies a gain to the voltage of the image sensor 1601, which voltage is increased to a desired voltage. An A/D converter 1603 converts the voltage into digital information. A shading corrector 1604 performs the shading correction.

An image processor 1606 performs image processing for the information supplied from the shading corrector 1604 by a common method to yield a fine image. The image processor 1606 performs, for example, the edge enhancement and the unsharp mask for finely displaying characters, the Moire correction for reducing Moire patterns, and/or the change of resolution and the gamma correction according to a user's preference. However, since these processes are well-known, a detailed description is omitted herein. If the gain adjustment etc. are automatically performed, the image processor 1606 may control the gain device 1602.

A correction detector 1607 uses the output from the shading corrector 1604 to detect any correction fluid trace and outputs positional information of the corrected portion or the corrected image. A synthesizer 1608 synthesizes the information detected by the correction detector 1607 with the image supplied from the image processor 1606.

A user interface 1609 is a panel which is used by the user to operate the image forming apparatus according to the third exemplary embodiment and in which information is displayed. A network controller 1610 is used when the image forming apparatus according to the third exemplary embodiment processes the image information and/or tasks including printing in cooperation with an external device, such as a PC, over a LAN or via a USB. An image storage area 1611 has the image information temporarily stored therein. A controller 1612 controls the entire image forming apparatus according to the third exemplary embodiment, and includes a CPU that performs the image processing and programs used by the CPU to operate in accordance with a process shown in FIG. 20. A recording unit 1613 is used for printing the image information when the user selects the copying or printing in the image forming apparatus according to the third exemplary embodiment.

FIG. 4 illustrates a button operation unit on an operation panel connected to the user interface 1609. Referring to FIG. 4, reference numeral 401 denotes a liquid crystal display, reference numeral 402 denotes a start button, and reference numeral 403 denotes a button section. The buttons in the button operation unit are used to determine a functional mode in the image forming apparatus according to the third exemplary embodiment.

[Exemplary Operation]

Figure 20:
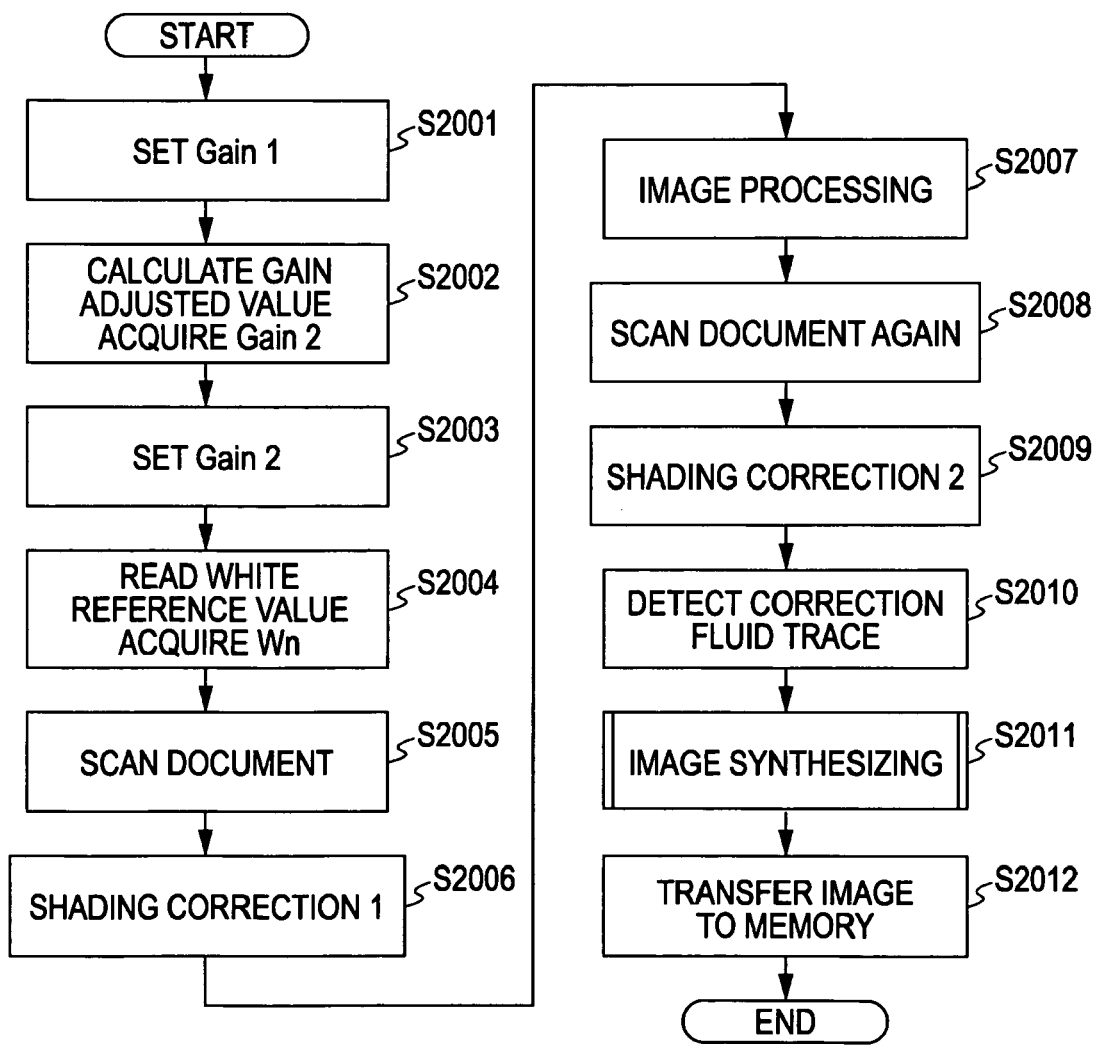
FIG. 20 is a flowchart showing a process in the image forming apparatus according to the third exemplary embodiment.

FIG. 20 is a flowchart showing a process in the image forming apparatus according to the third exemplary embodiment. The process in the image forming apparatus having the configuration described above will be described in detail with reference to FIGS. 16 and 20. A case where the user selects electronic imaging in a public record mode by operating the button section 403 in the button operation unit on the operation panel, in FIG. 4, connected to the user interface 1609, will be described.

The controller 1612 starts to read an image on the basis of the operational information supplied from the user interface 1609. In Step S2001, the controller 1612 causes the image sensor 1601 to read a white reference value in a state in which an image having a higher luminance can be read, that is, in a state in which a small amount of gain (Gain 1) is set in the gain device 1602, to obtain the voltage of the white reference value. The white reference value is generally a value of a white plate mounted to a reader. The image having the white reference value is given a small amount of gain in the gain device 1602 and is digitized in the A/D converter 1603 to generate a digital image before the gain adjustment.

The image processor 1606 under the control of the controller 1612 or the controller 1612 detects luminance information E1 (reference numeral E hereinafter denotes a voltage) producing a maximum luminance, in the digital image before the gain adjustment, to calculate a gain used for actually reading an image of a document according to the following equation.

$$\text{Gain } 2 = E2 \times \text{Gain } 1 / E1 \quad \quad \text{[Formula 9]}$$

where, for example, "2.8", is substituted for E2 if the output level of the white reference value is set to 2.8 V.

In Step S2002, Gain 2 is adjusted such that the voltage E2 when the luminance of the correction fluid is read is within the range of the input voltage of the A/D converter 1603. In Step S2003, Gain 2 that is adjusted is set in the gain device 1602. In Step S2004, the image sensor 1601 reads the white reference value again. Gain 2 is applied to the voltage of the read image in the gain device 1602, and the image is converted into digital information for every pixel in the A/D converter 1603. After the conversion into the digital information, shading correction data Wn (n denotes a position in the main scanning direction) is acquired in the shading corrector 1604.

In Step S2005, the image sensor 1601 scans a document set by the user. The gain device 1602 applies Gain 2 to the analog image, which is scanned by the image sensor 1601 and has a voltage converted for every pixel in the document, and the analog image has the voltage E2. The analog image having the voltage E2 is converted into a digital image V2 (v hereinafter denotes a luminance) in the A/D converter 1603, and the digital image is supplied to the shading corrector 1604.

In order to read an image having a higher quality, in Step S2006, the shading correction is performed in the shading corrector 1604 according to Formula 10.

$$V3n = C1 * V2n / Wn \quad \quad \text{[Formula 10]}$$

where

C1 denotes a first shading correction coefficient,

V3n denotes the luminance of a digital image signal of the n-th pixel in the main scanning direction after the shading correction, V2n denotes the luminance of a digital image signal of the n-th pixel in the main scanning direction before the shading correction, and Wn denotes the shading correction data.

Generally, in the 8-bit grayscale, it is necessary to perform the shading correction such that the output level of the white paper, which is the background, becomes about "255". Accordingly, the first shading correction coefficient C1 is adjusted with respect to the white-paper reference value. The adjustment of the luminance level from the gain adjustment to the shading correction is performed in the same manner as in the related art, described above with reference to FIGS. 2A to 2C.

In Step S2007, the output luminance value V3 in consideration of the white-paper reference value from the shading corrector 1604 in the first scanning is subjected to the image processing in the image processor 1606 in a mode selected by the user. Since the image processing in the image processor 1606 is irrelevant to the nature of the present invention, a detailed description is omitted herein. The image processor 1606 generally performs the edge enhancement, the gamma correction, etc. in order to provide a high-quality image.

In Step S2008, the image sensor 1601 scans the document, set by the user, again. The gain device 1602 applies Gain 2 to the analog image, which is scanned by the image sensor 1601 and has a voltage converted for every pixel in the document, and the analog image has the voltage E2. The analog image having the voltage E2 is converted into the digital image V2 in the A/D converter 1603, and the digital image is supplied to the shading corrector 1604.

Figure 17:
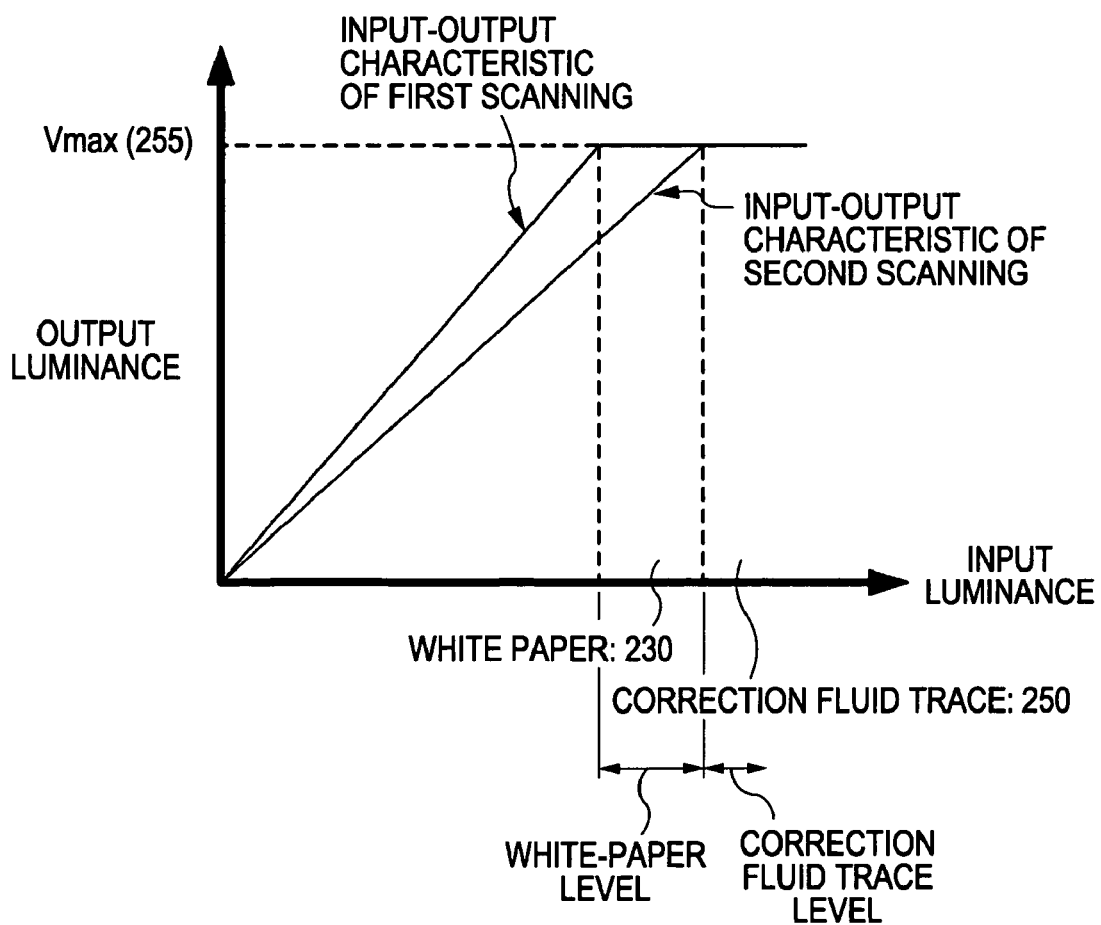
FIG. 17 illustrates the relationship between the input luminance and the output luminance, in the first scanning and the second scanning, according to the third embodiment of the present invention.

FIG. 17 illustrates the relationship between the input luminance and the output luminance, in the first scanning (S2005) using the first shading correction coefficient C1 and the second scanning (S2008) using the second shading correction coefficient C2. Referring to FIG. 17, if the input luminance on the horizontal axis is equal to a white-paper level "230", the output in the first scanning is normalized so as to reach a luminance level "Vmax (255)" whereas the output in the second scanning is normalized to a luminance level "235". In contrast, the white correction fluid trace having the input luminance "250" is normalized so as to reach the luminance level "255" both in the first scanning and the second scanning.

Referring back to Step S2009, the shading correction in consideration of the correction fluid is performed in the shading corrector 1604 according to Formula 11.

$$V3n = C2 * V2n / Wn \quad \text{[Formula 11]}$$

where

C2 denotes a second shading correction coefficient,

V3n denotes the luminance of a digital image signal of the n-th pixel in the main scanning direction after the shading correction, V2n denotes the luminance of a digital image signal of the n-th pixel in the main scanning direction before the shading correction, and Wn denotes the shading correction data.

The target of the second shading correction coefficient C2 is the correction fluid trace having a luminance higher than that of the white paper. Here, the second shading correction coefficient C2 is adjusted such that the luminance of the correction fluid trace reaches "255" and that the white-paper reference value (background) is equal to a value that does not cause saturation. That is, only the correction fluid trace has the output level "255" and the other parts have the output levels not more than "254".

Referring back to FIG. 20, in S2010, the image output from the shading corrector 1604 in the second scanning is checked for any correction fluid trace in the correction detector 1607. Two exemplary methods of detecting any correction fluid trace will be described.

EXAMPLE 1 OF DETECTION METHOD (PART OF S2010)

FIG. 7 is a flowchart showing a first example of the method of detecting any correction fluid trace, according to the third exemplary embodiment. As described above with reference to FIG. 17, the white correction fluid is detected in an area having the output luminance level reaching "255". Accordingly, referring to FIG. 7, in Step S701, the controller 1612 performs the simple binarization for the image output from the shading corrector 1604 in the second scanning by using "255", or "255-α" (α is a value that can be set) as a threshold value. In this binarization, "1" represents a pixel read from a correction fluid trace portion and "0" represents a pixel read from a non-correction fluid trace portion. An example of the image binarized in Step S701 is shown in FIG. 8B.

In Step S702, the controller 1612 removes any isolated point, which is considered not to be the correction fluid trace. The isolated point is produced due to a noise or dust. The isolated point is removed in order to prevent the non-correction-fluid part from being determined as the pixels read from a correction fluid trace portion.

The detection of the correction fluid trace will be described. In Step S703, the controller 1612 detects a closed curve, which is a boundary between the correction fluid portion and the non-correction-fluid portion. FIG. 9 illustrates how to detect the closed curve in Step S703 in the detection of the correction fluid trace according to the third exemplary embodiment.

Referring to FIG. 9, the controller 1612 scans-in the main scanning direction to search for a first pixel read from a correction fluid trace portion. Since the pixels read from a correction fluid trace portion draw a boundary between the pixels read from a correction fluid trace portion and the pixels read from a non-correction fluid trace portion, the controller 1612 checks peripheral pixels if "1" is detected. In the example in FIG. 9, the upper, upper right, left, upper left, and lower left pixels with respect to the first target pixel are the pixels read from a non-correction fluid trace portion, while the right, lower right, and lower pixels with respect to the first target pixel are the pixels read from a correction fluid trace portion. Accordingly, the right or lower pixel (on the boundary) with reference to the first target pixel is made a second target pixel. Such processing is repeated to scan the edge of the correction fluid portion, that is, the boundary between the pixels read from a correction fluid trace portion and the pixels read from a non-correction fluid trace portion. When the target pixel returns to the first target pixel, the trail of the target pixels that have been scanned corresponds to the edge of the correction fluid portion and the pixels read from a correction fluid trace portion exist inside the edge. This processing is performed for all the areas in the image.

In Step S704, the controller 1612 determines information concerning the correction fluid trace. Specifically, since an area having a smaller number of continuous pixels on the trail, that is, a small correction fluid portion is unlikely to be corrected even if the correction fluid is applied and can be processed similarly to the isolated point, such an area is considered as the non-correction-fluid portion. In contrast, an area in which the continuous length of the edge of the correction fluid is too long is not probably produced in normal use of the correction fluid and, therefore, a special sheet of paper having a higher luminance is possibly used. Hence, such a sheet of paper is considered as the correction fluid portion to generate information concerning the correction fluid. The threshold value of the continuous length is made possible to be set as a parameter. After the information concerning the correction fluid portion has been generated for one page, the information is supplied to the synthesizer 1608.

EXAMPLE 2 OF DETECTION METHOD (PART OF S2010)

FIG. 10 is a flowchart showing a second example of the method of detecting any correction fluid trace, according to the third exemplary embodiment. As described above with reference to FIG. 17, the white correction fluid is detected in an area having the output luminance level reaching "255". Accordingly, referring to FIG. 10, in Step S1001, the controller 1612 performs the simple binarization for the image output from the shading corrector 1604 in the second scanning by using "255" or "255-α" (α is a value that can be set) as a threshold value. In this binarization, "1" represents a pixel read from a correction fluid trace portion and "0" represents a pixel read from a non-correction fluid trace portion. An example of the image binarized in Step S1001 is shown in FIG. 8B.

In Step S1002, the controller 1612 removes any isolated point, which is considered not to be the correction fluid trace. The isolated point is produced due to a noise or dust. The isolated point is removed in order to prevent the non-correction-fluid part from being determined as the pixels read from a correction fluid trace portion.

The detection of the correction fluid trace will be described. In Step S1003, the controller 1612 detects a predetermined size area of the correction fluid. FIGS. 11A and 11B illustrate how to detect the predetermined size area in Step S1003 in the detection of the correction fluid trace according to the third exemplary embodiment. If the binary signals shown FIGS. 11A and 11B have been detected, the controller 1612 measures the continuous quantities of the correction fluid portion (the pixels having the value "1" in FIGS. 11A and 11B) in the main scanning direction and in the secondary scanning direction. This measurement is performed for all the areas in the image.

In Step S1004, the controller 1612 determines information concerning the correction fluid trace. Specifically, an area in which the continuous quantities of the correction fluid portion in the main scanning direction and in the secondary scanning direction exceed a predetermined amount is determined as the predetermined size area of the correction fluid. In contrast, an area in which the continuous quantities of the correction fluid portion in the main scanning direction and in the secondary scanning direction do not exceed the predetermined amount is considered not to be the predetermined size area of the correction fluid. Such an area is processed similarly to the isolated point due to a noise or dust and is processed as the non-correction-fluid-trace area. Referring to FIGS. 11A and 11B, the large central area is considered as the correction fluid trace area, and the small lower-right area is considered as the isolated area and is processed as the non-correction-fluid-trace area. All the areas having the value "0" are the non-correction-fluid-trace areas. The threshold value of the continuous quantities is made possible to be set as a parameter. After the information concerning the correction fluid portion has been generated for one page, the information is supplied to the synthesizer 1608.

EXAMPLE 1 OF IMAGE SYNTHESIZING
(S2011)

Referring back to FIG. 20, the image and the information concerning the correction fluid trace are generated through the steps from Step S2001 to S2010, and the image is synthesized with the information concerning the correction fluid trace in the synthesizer 1608. In Step S2011, a first example of image synthesizing is performed in the synthesizer 1608. The image subjected to the appropriate image processing in the image processor 1606 is supplied to the synthesizer 1608. In addition, the information concerning the correction fluid trace, detected in the correction detector 1607, is also supplied to the synthesizer 1608.

The synthesizer 1608 synthesizes the image supplied from the image processor 1606 with the information concerning the correction fluid trace, supplied from the correction detector 1607. The luminance of pixels on the edge of the correction fluid trace is set to "0" to draw a black frame line, which is visible to the third person.

EXAMPLE 2 OF IMAGE SYNTHESIZING
(S2011)

The image and the information concerning the correction fluid trace are generated through the steps from Step S2001 to S2010, and the image is synthesized with the information concerning the correction fluid trace in the synthesizer 1608. In Step S2011, a second example of the image synthesizing is performed in the synthesizer 1608. The image subjected to the appropriate image processing in the image processor 1606 is supplied to the synthesizer 1608. In addition, the information concerning the correction fluid trace, detected in the correction detector 1607, is also supplied to the synthesizer 1608.

The synthesizer 1608 embeds the information concerning the correction fluid trace, supplied from the correction detector 1607, in the image supplied from the image processor 1606 as a digital watermark. Specifically, the image supplied from the image processor 1606 is subjected to Fourier transform to be converted into frequency information. The frequency information is synthesized with the information concerning the correction fluid trace, supplied from the correction detector 1607. Then, the frequency information synthesized with the information concerning the correction fluid trace is subjected to inversed Fourier transform to be returned to the original image. Since the above operation diffuses the information concerning the correction fluid trace in the image, it is not possible to extract the information concerning the correction fluid trace without a special analysis.

[Exemplary Post-Processing]

"Example 1 of Detection Method" or "Example 2 of Detection Method" is combined with "Example 1 of Image Synthesizing" or "Example 2 of Image Synthesizing" to generate a digital output image according to the third exemplary embodiment.

After the above steps are finished, then in Step S2012, the controller 1612 stores the digital output image in the image storage area 1611. The controller 1612 transfers the digital output image to a personal computer or the like through the network controller 1610 and over a network. The controller 1612 may supply the digital output image to the recording unit 1613 to print the image. If the image includes the correction fluid trace, the controller 1612 issues a warning to the user through the user interface 1609. If no correction fluid trace has been detected, the controller 1612 may attach a trace certifying that no correction fluid trace is detected to the image.

Other Exemplary Embodiments

In addition to the embodiments described above, the present invention can be realized by other embodiments.

The aforementioned embodiments can be realized by software sequentially performing the data processing, in addition to the hardware connected to a network. In other words, the present invention can be embodied by supplying a storage medium (or a recording medium) having the program code of software realizing the functions according to the above embodiments to a system or an apparatus, the computer (or the CPU or the micro processing unit (MPU)) in which system or apparatus reads out and executes the program code stored in the storage medium. In this case, the program code itself read out from the storage medium realizes the functions of the embodiments described above. The program code can be written in any storage medium, such as a compact disc (CD), a magnetic disk (MD), a memory card, or a magneto-optical disc (MO).

The computer that executes the readout program code realizes the functions of the embodiments described above. In addition, the operating system (OS) or the like running on the computer may execute all or part of the actual processing based on instructions in the program code to realize the functions of the embodiments described above.

Alternatively, after the program code read out from the storage medium has been written in a memory that is provided in an expansion board included in the computer or in an expansion unit connected to the computer, the CPU or the like in the expansion board or the expansion unit may execute all or part of the actual processing based on instructions in the program code to realize the functions of the embodiments described above.

Although the image forming apparatus serving as the multifunctional peripheral is described in the above embodiments, the present invention is applicable to an image forming apparatus, which is a copy machine having the copy function, an image scanning apparatus having only the image scanning function, etc., in addition to the multifunctional peripheral.

The image scanning apparatuses according to the first to third embodiments of the present invention are summarized in the following manner. According to the first or second embodiment of the present invention, an image scanning apparatus includes a gain unit (302 or 1201) configured to convert image information into a voltage and to apply a desired gain to the voltage in scanning; an analog-to-digital conversion unit (303 or 1203) configured to digitize the image information to which the gain is applied by the gain unit to generate a digital image; a first shading correction unit (304 or 1204) configured to perform shading correction for the digital image generated by the analog-to-digital conversion unit by using a first coefficient on the basis of a white reference value, in order to yield an image that is finer than the digital image, to output a corrected image; a second shading correction unit (305 or 1205) configured to perform shading correction for the digital image generated by the analog-to-digital conversion unit by using a second coefficient on the basis of a corrected trace, in order to yield an image of which a luminance higher than the white reference value is read, to output a corrected image; an image processing unit (306 or 1206) configured to perform image processing for the image output from the first shading correction unit to generate first digital image information; a correction detecting unit (307 or 1207) configured to detect the corrected trace from the image output from the second shading correction unit to generate second digital image information, which is detection information concerning the corrected trace; and a synthesizing unit (308 or 1208) configured to synthesize the first digital image information generated by the image processing unit with the second digital image information generated by the correction detecting unit to generate third digital image information in which the detection information concerning the corrected trace, which is the second digital image information, is embedded in the first digital image information.

In the above image scanning apparatuses each including the first shading corrector and the second shading corrector, a fine image of a document is acquired in the first shading correction and the shading correction is performed in the second shading correction such that the correction trace can be scanned and an image having a higher luminance can be scanned. Synthesizing the first image supplied from the first shading corrector with the detection information concerning the corrected trace, detected from the second image supplied from the second shading corrector, can provide a fine image from which the information concerning the corrected trace can be determined.

According to the second embodiment, as shown in FIG. 14, the correction detecting unit detects the corrected trace on the basis of a difference between the image output from the first shading correction unit and the image output from the second shading correction unit.

With this structure, synthesizing the first image supplied from the first shading corrector with the detection information concerning the corrected trace, detected from a difference between the first image and the second image supplied from the second shading corrector, can provide a fine image from which the information concerning the corrected trace can be determined.

According to the third embodiment of the present invention, an image scanning apparatus includes a gain unit (1602) configured to convert image information into a voltage and to apply a desired gain to the voltage in scanning; an analog-to-digital conversion unit (1603) configured to digitize the image information to which the gain is applied by the gain unit to generate a digital image; a shading correction unit (1604) configured to perform shading correction for the digital image generated by the analog-to-digital conversion unit by using a first coefficient on the basis of a white reference value, in order to yield an image that is finer than the digital image, to output a first corrected image, and to perform shading correction for the digital image generated by the analog-to-digital conversion unit by using a second coefficient on the basis of a corrected trace, in order to yield an image of which a luminance higher than the white reference value is read, to output a second corrected image; an image processing unit (1606) configured to perform image processing for the first image output from the shading correction unit to generate first digital image information; a correction detecting unit (1607) configured to detect the corrected trace from the second image output from the shading correction unit to generate second digital image information, which is detection information concerning the corrected trace; and a synthesizing unit (1608) configured to synthesize the first digital image information generated by the image processing unit with the second digital image information generated by the correction detecting unit to generate third digital image information in which the detection information concerning the corrected trace, which is the second digital image information, is embedded in the first digital image information.

According to the fourth embodiment, as shown in FIG. 20, in a first scanning, the gain unit and the analog-to-digital conversion unit are operated, the shading correction unit outputs the first image, and the image processing unit generates the first digital image information. In a second scanning, the gain unit and the analog-to-digital conversion unit are operated, the shading correction unit outputs the second image, and the correction detecting unit generates the second digital image information.

In the image scanning apparatus having the above configuration, synthesizing the first image generated by using the first shading correction coefficient with the detection information concerning the corrected trace, detected from the second image generated by using the second shading correction coefficient, can provide a fine image from which the information concerning the corrected trace can be determined.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-121030 filed Apr. 19, 2005, which is hereby incorporated by reference herein in its entirety.

What is claimed is:

1. An image scanning apparatus comprising:
a gain unit configured to convert image information into a voltage and apply a desired gain to the voltage during a scanning operation;
an analog-to-digital conversion unit configured to digitize the image information to generate a digital image;
a first shading correction unit configured to perform shading correction to the digital image by using a first coefficient correlated to a white reference value to yield a first corrected image;
a second shading correction unit configured to perform shading correction to the digital image by using a second coefficient correlated to a corrected trace to yield a second corrected image having a luminance higher than the white reference value;
an image processing unit configured to perform image processing to the first corrected image to generate first digital image information;
a correction detecting unit configured to detect the corrected trace from the second corrected image to generate second digital image information which is detection information concerning the corrected trace; and
a synthesizing unit configured to synthesize the first and second digital image information together to generate third digital image information in which the detection information concerning the corrected trace is embedded in the first digital image information,
wherein the correction detecting unit generates the second digital image information by considering an area having a smaller number of continuous pixels on a trail of detection of a closed curve, performed by using the image, than a predetermined threshold as a non-correction-fluid portion, and by considering an area having a larger continuous amount on the trail as a correction-fluid-portion.

2. The image scanning apparatus according to claim 1, wherein the correction detecting unit is configured to detect the corrected trace on a basis of a difference between the first and second corrected images.

3. An image scanning apparatus comprising:
a gain unit configured to convert image information into a voltage and apply a desired gain to the voltage during a first scanning operation;
an analog-to-digital conversion unit configured to digitize the image information to generate a digital image;
a shading correction unit configured to perform shading correction to the digital image by using a first coefficient correlated to a white reference value to yield a first corrected image, and to perform shading correction to the digital image by using a second coefficient correlated to a corrected trace to yield a second corrected image having a luminance higher than the white reference value;
an image processing unit configured to perform image processing to the first corrected image to generate first digital image information;
a correction detecting unit configured to detect the corrected trace to generate second digital image information which is detection information concerning the corrected trace; and
a synthesizing unit configured to synthesize the first and second digital image information together to generate third digital image information in which the detection information concerning the corrected trace is embedded in the first digital image information,
wherein the correction detecting unit generates the second digital image information by considering an area having a smaller number of continuous pixels on a trail of detection of a closed curve, performed by using the image, than a predetermined threshold as a non-correction-fluid portion, and by considering an area having a larger continuous amount on the trail as a correction-fluid-portion.

4. The image scanning apparatus according to claim 3,
wherein, in the first scanning operation, the gain unit and the analog-to-digital conversion unit are operated, the shading correction unit outputs the first corrected image, and the image processing unit generates the first digital image information, and
wherein, in a second scanning operation, the gain unit and the analog-to-digital conversion unit are operated, the shading correction unit outputs the second corrected image, and the correction detecting unit generates the second digital image information.

5. An image forming apparatus in combination with an image scanning apparatus, the image scanning apparatus comprising:
a gain unit configured to convert image information into a voltage and apply a desired gain to the voltage during a scanning operation;
an analog-to-digital conversion unit configured to digitize the image information to generate a digital image;
a first shading correction unit configured to perform shading correction to the digital image by using a first coefficient correlated to a white reference value to yield a first corrected image;
a second shading correction unit configured to perform shading correction to the digital image by using a second coefficient correlated to a corrected trace to yield a second corrected image having a luminance higher than the white reference value;
an image processing unit configured to perform image processing to the first corrected image to generate first digital image information;
a correction detecting unit configured to detect the corrected trace from the second corrected image to generate second digital image information which is detection information concerning the corrected trace; and
a synthesizing unit configured to synthesize the first and second digital image information together to generate third digital image information in which the detection information concerning the corrected trace is embedded in the first digital image information,
wherein the correction detecting unit generates the second digital image information by considering an area having a smaller number of continuous pixels on a trail of detection of a closed curve, performed by using the image, than a predetermined threshold as a non-correction-fluid portion, and by considering an area having a larger continuous amount on the trail as a correction-fluid-portion.

6. An image scanning method comprising:
converting image information into a voltage and applying a desired gain to the voltage during a scanning operation;
digitizing the image information to generate a digital image;

performing shading correction to the digital image by using a first coefficient correlated to a white reference value to yield a first corrected image that is finer than the digital image;

performing shading correction to the digital image by using a second coefficient correlated to a corrected trace to yield a second corrected image having a luminance higher than the white reference value;

performing image processing to the first corrected image to generate first digital image information;

detecting the corrected trace to generate second digital image information which is detection information concerning the corrected trace; and synthesizing the first and second digital image information together to generate third digital image information in which the detection information concerning the corrected trace is embedded in the first digital image information, wherein the detecting of the corrected trace generates the second digital image information by considering an area having a smaller number of continuous pixels on a trail of detection of a closed curve, performed by using the image, than a predetermined threshold as a non-correction-fluid portion, and by considering an area having a larger continuous amount on the trail as a correction-fluid-portion.

7. The image scanning method according to claim 6, wherein the corrected trace is detected on the basis of a difference between the first and second corrected images.

8. An image scanning method comprising:

converting image information into a voltage and applying a desired gain to the voltage in a first scanning operation;

digitizing the image information to generate a digital image;

performing shading correction to the digital image by using a first coefficient correlated to a white reference value to yield a first corrected image;

performing image processing to the first corrected image to generate first digital image information;

converting image information into a second voltage and applying a desired second gain to the second voltage in a second scanning operation;

digitizing the image information to which the second gain is applied to generate a second digital image;

performing shading correction to the second digital image by using a second coefficient correlated to a corrected trace to yield a second corrected image having a luminance higher than the white reference value;

detecting the corrected trace to generate second digital image information which is detection information concerning the corrected trace; and synthesizing the first and second digital image information together to generate third digital image information in which the detection information concerning the corrected trace is embedded in the first digital image information, wherein the detecting of the corrected trace generates the second digital image information by considering an area having a smaller number of continuous pixels on a trail of detection of a closed curve, performed by using the image, than a predetermined threshold as a non-correction-fluid portion, and by considering an area having a larger continuous amount on the trail as a correction-fluid-portion.

9. A computer recording medium containing computer-executable instructions for causing a computer to execute an image scanning process, the medium comprising:

instructions for converting image information into a voltage and applying a desired gain to the voltage in a scanning operation;

instructions for digitizing the image information to which the gain is applied to generate a digital image;

instructions for performing shading correction to the digital image by using a first coefficient correlated to a white reference value to yield a first corrected image;

instructions for performing shading correction to the digital image by using a second coefficient correlated to a corrected trace to yield a second corrected image having a luminance higher than the white reference value;

instructions for performing image processing to the first corrected image to generate first digital image information;

instructions for detecting the corrected trace from the second corrected image to generate second digital image information which is detection information concerning the corrected trace; and instructions for synthesizing the first and second digital image information together to generate third digital image information in which the detection information concerning the corrected trace is embedded in the first digital image information, wherein the instructions for detecting the corrected trace generates the second digital image information by considering an area having a smaller number of continuous pixels on a trail of detection of a closed curve, performed by using the image, than a predetermined threshold as a non-correction-fluid portion, and by considering an area having a larger continuous amount on the trail as a correction-fluid-portion.

* * * * *